United States Patent
Wehner

(10) Patent No.: US 9,739,507 B2
(45) Date of Patent: Aug. 22, 2017

(54) FLUID TEMPERATURE LIMITER

(71) Applicant: Thomas Richard Wehner, Santa Fe, NM (US)

(72) Inventor: Thomas Richard Wehner, Santa Fe, NM (US)

( * ) Notice: Subject to any disclaimer, the term of this patent is extended or adjusted under 35 U.S.C. 154(b) by 428 days.

(21) Appl. No.: 14/303,244

(22) Filed: Jun. 12, 2014

(65) Prior Publication Data

US 2015/0362219 A1 Dec. 17, 2015

(51) Int. Cl.
*F24J 2/40* (2006.01)
*G05D 23/13* (2006.01)
*F24J 2/46* (2006.01)
*F24J 2/24* (2006.01)
*F24J 2/44* (2006.01)
*F28D 21/00* (2006.01)

(52) U.S. Cl.
CPC ........... *F24J 2/402* (2013.01); *F24J 2/24* (2013.01); *F24J 2/44* (2013.01); *F24J 2/4625* (2013.01); *G05D 23/1346* (2013.01); *F28D 2021/0029* (2013.01); *Y02E 10/40* (2013.01)

(58) Field of Classification Search
CPC ........ F24J 2/402; F24J 2/24; F24J 2/44; F24J 2/4625; F28D 2021/0029; Y02E 10/40; Y02E 10/44; G05D 23/1306; G05D 23/1346; G05D 23/134; G05D 23/1353; F28F 27/02
See application file for complete search history.

(56) References Cited

U.S. PATENT DOCUMENTS

| | | | |
|---|---|---|---|
| 4,102,325 A | | 7/1978 | Cummings |
| 4,473,063 A | * | 9/1984 | Mackensen ............ F24J 2/402 126/585 |
| 7,823,582 B2 | | 11/2010 | Harrison |
| 7,913,684 B2 | | 3/2011 | Butler |
| 8,220,453 B2 | | 7/2012 | Bourke |
| 8,459,248 B2 | | 6/2013 | Milder |
| 8,726,898 B2 | | 5/2014 | Torrens Rasal |
| 2010/0059047 A1 | | 3/2010 | Bourke |

* cited by examiner

*Primary Examiner* — Alfred Basichas

(57) ABSTRACT

The present invention limits fluid temperature at a point in a fluidic system to below a predetermined temperature by cooling the fluid when needed and without requiring a separate cold fluid source. The present invention "clips" the temperature of the fluid at a point in the system to within a temperature range and prevents overcooling the fluid. When the fluid temperature is below the temperature range, the temperature of the fluid is unchanged as it passes through the apparatus of the present invention. The present invention may operate without external power, can function in any orientation, and works for unpressurized and pressurized systems. The present invention has application in the areas of solar thermal energy systems, fluid tanks, engine oil and coolant systems, transmission fluid systems, hydraulic systems, machining fluid systems, cutting fluid systems, nuclear reactors and chemical reactors, among others.

4 Claims, 17 Drawing Sheets

FLUID TEMPERATURE LIMITER

CROSS REFERENCE TO RELATED APPLICATIONS

This application is a Continuation In Part of PCT international patent application number PCT/US2013/050745 filed Jul. 16, 2013, by the present inventor, which is a Continuation In Part of U.S. patent application Ser. No. 13/556,172 filed Jul. 23, 2012, by the present inventor, both of which are incorporated by reference.

BACKGROUND OF THE INVENTION

1. Field of the Invention

The present invention relates to fluidic systems, both closed and open systems, in which fluid temperature control at a point in the system is necessary or desirable. The present invention prevents fluid temperature from exceeding a predetermined set temperature at a point in the piping of a system, by cooling the flow in a controlled manner when required. One of the applications of the present invention is in the area of renewable energy, specifically solar thermal systems for water heating and space heating. Other applications include, but are not limited to, temperature clipping of: engine oil, engine coolant, transmission fluid, hydraulic fluid, cutting fluid, machining fluid, and fluid in a tank.

2. Description of the Prior Art

Many solar thermal heating systems suffer from overheating problems, including the loss-of-load problem, the over-supply problem, and the loss-of-flow problem. Loss-of-load and over-supply problems involve a mismatch in which the heat supply from the solar collector or collectors is greater than the heat load or demand. The loss-of-flow problem involves a loss or degradation of system fluid flow usually due to pump stoppage or slowing. Overheating of the fluid experiencing these problems sometimes leads to fluid breakdown, boiling and overpressurization in the solar collector(s), and consequently to damage to the solar collector(s) and other parts of the system.

Drainback and draindown type solar thermal systems deal with overheating problems using a control system to detect the overheat situation, then turn off the fluid pump allowing the fluid to drain out of the solar collectors. Other types of solar thermal systems deal with overheating problems in other ways. However, closed-loop solar thermal systems do not have a solid, proven means of dealing with overheating in all situations.

A classic loss-of-load solar-hot-water problem typically arises when a family goes on vacation in the summer without putting the solar system into vacation mode. With the water in a hot water storage tank already hot, and no calls for hot water, the system may overheat even with the system pump on because the solar collectors continue to add heat to the system which does not need it. Fluid breakdown, boiling and over-pressurization of the fluid in the solar collector usually follow, with accompanying damage to the solar collector(s), the solar thermal system and/or to the fluid itself in the case of antifreeze solutions. This is an example of the loss-of-load problem.

Some solar thermal system designers opt to degrade the solar-hot-water-heating system performance to provide almost all of the hot water in summer and about half of the hot water needed in winter to avoid overheating in summer. They choose to under-size the system to avoid overheating on the hottest summer days when the solar collectors may be producing at their highest heat levels. If designers were to design a system with more solar collector area for more hot water in winter, the system could produce an over-supply of heat at times in the summer, thus potentially leading to overheating and consequent fluid breakdown, boiling and over-pressurization of the fluid, and accompanying damage as described above. This is an example of the over-supply problem.

When the system fluid pump stops or slows down or for any flow degradation condition, the stagnant or nearly stagnant fluid in the solar collector on a sunny day may increase in temperature to the point where it breaks down and/or boils, again causing damage. This is an example of the loss-of-flow problem.

Others have attempted to solve these problems in different ways. US Patent Application Number 20100059047 describes an automated over-temperature protection system that uses a pressure vessel near the outlet of the solar collector. " . . . in the event that fluid in the solar energy absorber vaporizes, the fluid is forced out of the solar energy absorber and into the pressure vessel." This protection system fails to prevent boiling before it starts. The allowed boiling may damage the system or fluid in the system.

U.S. Pat. No. 7,823,582 describes an automated solar collector temperature controller which opens dampers to the air space of the flat plat solar collector. This protection system works only for flat plate solar collectors, and compromises the thermal integrity of the solar collector with openings and mechanical dampers which wear and eventually fail to close or open completely or properly.

U.S. Pat. No. 7,913,684 describes an automated protection system to remove vapor from a solar collector and indirectly cool it should fluid boiling occur in the solar collector in a pressurized solar thermal heating system. This system only addresses a loss of flow, only works for a pressurized system, and by itself fails to prevent boiling. The patent adds dampers to the flat plate collector in the same fashion as the patent above. This damper system works only for flat plate solar collectors, and compromises the thermal integrity of the solar collector with openings and mechanical dampers which wear and eventually fail to close or open completely or properly.

U.S. Pat. No. 4,102,325 describes an automated solar collector temperature control system which uses a thermosyphon, a valve and additional tubing integrated into and attached to the solar collector. This system is expensive and complex.

U.S. Pat. No. 8,459,248 describes a solar heating and cooling system that allows a thermosyphon loop to cool the fluid in the collector in pump-off situations. This system requires the system pump to be off to allow the cooling system to function. The system does not work for the loss-of-load problem, for the over-supply problem, for the partial-system-flow situation, nor any pump-on failure mode. "When the fluid pump is off, the working fluid circulates through the thermosyphon cooling loop, but when the fluid pump is on, the working fluid circulates through a heating loop." Overheating may still occur with this system in pump-on failure modes. In addition, because the cooling assembly is "integral with" the back side of the solar collector, the system is not low-profile when flush-mounted to a roof.

Some solar thermal heating systems use separate heat dumps to shed excess heat. Typically, a heat dump may be a hot tub, a swimming pool, a slab of concrete with embedded hydronic tubing, a liquid-to-air heat dissipator, or other heat-dissipating device. Customary practice is to place a thermostatic valve downstream of the outlet of the solar collectors, and to divert some or all of the flow through the heat dump. This method overcools the fluid because there is no temperature feedback where the diverted flow returns to the system. This wastes energy, and results in longer times to bring the storage tank up to temperature.

Some solar thermal heating systems use multiple sensors, electrically operated valves, electronic control systems, and heat dumps to limit fluid temperature. These systems are generally complex, expensive and difficult to service and to diagnose when troubles arise.

Some solar thermal heating systems use periodic heat dumping by hot water discharge to bring the temperature of storage tanks back down to within operating range. These systems risk allowing tank fluid temperatures to get too high, and waste water by discharging hot water down the drain and injecting cold water. Such systems are potentially unsafe and wasteful of energy and water.

Solar thermal systems retrofit installations are infrequently done because of the expense and complexity of the installation. Much of the complexity and expense come from the lack of an available heat dump or the difficulty and expense of piping to a heat dump. When they are done, such retrofit installations typically are undersized to prevent overheating problems. Use of renewable energy in solar thermal systems is hampered by the complexity and expense of installation and is underutilized by undersizing.

Thermostatically controlled valves, both mixing valves and diverting valves, have been used for many years for fluid temperature control. For example, they are used for large diesel-engine-based electric generators to control coolant temperature to and from the engine and lubricating oil temperature to and from the engine. These valves typically combine coolant pumped from the engine with coolant from an external heat dump, usually outside the building housing the engine. These valve arrangements do not provide in-line cooling, and require an external source of cooling.

Thermostatic mixing valves are used in boiler-type heating systems for various purposes, including reducing the temperature of the fluid from the boiler going into a hydronic radiant floor. This system uses the return fluid from the radiant floor as the source of colder fluid. Such a cold return is not available in a solar thermal system and many other fluidic systems.

Thermostatic mixing valves are also used on domestic hot water systems to reduce the risk of scalding should the water heater produce water hot enough to burn the skin. This system uses the cold water source to reduce the water temperature. Such a cold source is not available in a solar thermal system.

Automobile engines typically use a thermostatic valve to allow coolant to leave the engine for cooling when the engine gets hot enough. However, typically the temperature of the coolant coming from the radiator and re-entering the engine is unregulated. This may produce cold sections in the engine and lead to increased wear.

Oil coolers for engines sometimes have a thermostatic valve where oil exits the engine. This valve sends oil back into the engine when the valve temperature is below a set value, but diverts the flow into a heat dissipator flow path when the valve temperature is above the set value, before returning to the engine. This system cools the oil when it becomes too hot, but does not control the amount of cooling as flow is simply directed into a heat dissipator without regard as to the fluid temperature exiting the heat dissipator. This results in overcooling the engine oil, especially in very cold climates.

Hydraulic systems need to operate within a small range of viscosity for proper operation and to avoid cutting component life short. This translates into maintaining the appropriate fluid temperature as viscosity is temperature dependent. Most current hydraulic systems simply have the operator watch for anomalous operation or watch temperature sensor gauges. When a high temperature issue arises and is detected, it is usually too late, with the result being that some hydraulic component malfunctions or fails. Current systems fail to prevent or mitigate high temperature conditions.

Cutting and machining fluids work best when they are at or below a predetermined temperature. Most current cooling systems for machines that use these fluids fail to limit temperature or maintain a constant fluid temperature.

In addition, current fluidic systems without electronic controls don't adjust to changing conditions such as ambient temperature, heat transfer rate from the heat dissipator, flow rate change from pump degradation, flow path blockage, or fluid temperature change. Adding electronic controls adds to the complexity of fluidic systems and adds extra expense.

SUMMARY OF THE INVENTION

The problems described above are solved in a new way with the present invention, called a T-clip herein. The T-clip is an automatic self-adjusting temperature-limiting apparatus for fluidic systems, both closed and open systems, in which fluid cooling is sometimes required or desired to keep the fluid temperature from exceeding a set high temperature limit above ambient at a point in the system. The T-clip limits the temperature of the fluid and prevents the fluid temperature from exceeding a predetermined set temperature range, by cooling the flow in a controlled manner when required, to bring the fluid temperature down to the predetermined setpoint temperature range. Thus, overcooling, as well as overheating, is prevented. When no cooling is needed, the fluid passes through the T-clip with little or no temperature change.

For a solar thermal system that has a T-clip, the T-clip prevents overheating and the consequent fluid breakdown, fluid boiling and the associated potential over-pressurization in the collector(s) for both pressurized and unpressurized systems as long as flow continues. The T-clip eliminates potential damage to the system from high fluid temperature because it limits the fluid temperature. The loss-of-load and the over-supply problems are solved with the T-clip.

With additional valves, an additional heat dissipator, and additional piping, the T-clip automatically prevents overheating in a solar thermal system in all system flow situations, and may also provide simple, reliable solar thermal system control functions.

The T-clip does not require an external or additional or secondary fluid source. It uses a thermostatic mixing valve (TMV) in a completely new way so that two or more separate fluid sources are not required. One fluid source suffices. The T-clip cools the fluid passing through it without the requirement for a separate fluid source, and hence has much wider application than a system requiring two fluid sources.

With certain design choices, the T-clip may operate without electricity or any external power source which also gives it broader application. The T-clip is simple and inexpensive, and will lead to greater penetration of solar thermal systems into the market.

The T-clip operates in any orientation, which makes it better than thermosyphon-only devices, which cannot, and again gives the T-clip broader application. However, flow through a T-clip may be driven by any external means including, but not limited to, a thermosyphon, a motor-driven pump, an air-bubbler-type pump and a vapor-bubbler-type pump.

Use of the T-clip to limit the temperature of fluid in a tank does not cause a loss of fluid as some systems do. Only heat is removed, and no fluid is wasted down the drain.

Engine oil, engine coolant, transmission fluid, hydraulic fluid, cutting fluid, machining fluid and other fluids are returned to the engines, machines or devices in which they are used, at the optimum operating temperature to give better performance and longer life to all components.

The T-clip is an apparatus comprising: a flow splitter at the inlet; a TMV at the outlet; two flow paths, including a high-heat-dissipating path, and a normally insulated, low-heat-dissipating path; and piping. The high-heat-dissipating flow path includes one or more heat dissipators which transfer heat to the ambient environment. The low-heat-dissipating path is piping. Flow is unidirectional and through one path or the other or both depending on the valve temperature response, in order to clip and maintain the fluid temperature when it is too high and to allow the fluid to pass unaltered in temperature when the fluid temperature is below a setpoint temperature. The T-clip is interposed into the piping of a fluidic system where the flow is unidirectional.

With the heat dissipator of the T-clip sized to reject heat at a rate that is greater than the maximum heat input rate from the rest of the flowing system beyond the T-clip and to provide a sufficient temperature decrease to actuate the TMV, the fluid temperature exiting the T-clip will be clipped or limited in high temperature situations. System design thus becomes easier, because the T-clip takes care of mismatches between the heat source and heat load. With the T-clip, solar thermal hot water heating systems may be designed to provide more of the hot water required year round, regardless of the changing solar heating rates during the year. With the T-clip, solar thermal systems may be sized and designed for the maximum number of occupants for the home, not just the number of people currently living in the home without risk of overheating.

If the orientation of the T-clip or the shape of the flow paths could lead to trapped air, gas and/or vapor in the T-clip, air bleed valves may be included usually at high points to prevent flow blockages in the piping or components.

In any situation in which unidirectional flow through the T-clip is in question, means for providing unidirectional flow, such as check valves, may be included.

A protective cover for the T-clip may be included. The cover protects the T-clip from the environment and weather while still allowing ventilation for heat dissipation. The cover also protects against skin burns from the hot high-heat-dissipating flow path. A sun shade may be included, as well.

When the pressure drop in the T-clip is too high, a pump may be included in the T-clip. As assurance that the high-heat-dissipating flow path dissipates sufficient heat, a fan may be added that blows air across the heat dissipator(s) of the T-clip.

The primary object of the T-clip is to provide a simple, reliable apparatus and method for limiting the fluid temperature at a point in a fluidic system by cooling the fluid in a controlled manner with temperature feedback to also prevent overcooling.

Another object of the T-clip is to provide a simple, reliable apparatus for preventing overheating, fluid breakdown and fluid boiling in solar thermal systems.

Another object of the T-clip is to allow solar thermal system design and construction to provide greater utilization of solar thermal energy without the need for complex control systems. The T-clip will allow for solar systems to be sized larger to provide higher percentages of the annual energy needs. Excess heat on clear, sunny, hot summer days is automatically removed by the heat-dissipating path of the T-clip without the need for electrical control circuits or more complex electronic control systems.

Another object of the T-clip is to provide a simpler, more reliable, less expensive means of accommodating the loss-of-load issue for solar hot water systems and solar space heating systems. When sized properly, the T-clip provides adequate heat rejection without the need for external heat dumps, electrical control circuits or electronic control systems.

Another object of the T-clip, when combined with additional valves, an additional heat dissipator, and additional piping, is to prevent overheating of solar collectors in all flow conditions: full flow, no flow and partial flow.

Another object of the T-clip, when combined with other piping and valves, is to provide control system functions for solar thermal systems.

Another object of the T-clip is to make solar hot water heating system retrofit installations easier. The T-clip provides heat rejection without the need for an external heat dump, or for electrical control circuits or more complex electronic control systems. In addition, a separate heat dump does not have to be created inside or outside the building or structure.

Another object of the T-clip is to provide a simple inexpensive apparatus for insertion into existing solar thermal systems to eliminate the risk of overheating. Some existing solar thermal systems might not have experienced boiling yet because the home owners have not yet forgotten to put the system into vacation mode when they leave, or because the summers were not quite hot enough to drive the system into the overheat and damage range. Insertion of the T-clip into these systems would preempt such overheating problems.

Another object of the T-clip is to provide a means for limiting the temperature of the fluid in a tank without wasting fluid or energy.

Another object of the T-clip is to provide a simple, reliable fluid temperature limiter for hydraulic systems, for engine oil systems, for engine coolant systems, for cutting fluid circulation systems, for machining fluid circulation systems, and for transmission fluid systems, that also prevents overcooling.

These and other objects of the T-clip, will become apparent to one skilled in the art upon reading the accompanying description, drawings, and claims set forth herein.

The non-powered T-clip is simple, inexpensive, and extremely reliable with almost no moving parts, operates in any orientation, requires no electricity, requires no electronic sensors or electronic control circuitry, and may be used in many fluidic system applications.

The T-clip, with its cost savings, design simplicity, and ease of installation, will revolutionize solar thermal water heating and space heating, and pave the way for greater renewable energy utilization. The T-clip will also revolutionize engine cooling systems.

The T-clip may be included in other types of fluid temperature limiting apparatuses, also described herein.

Figure 1:
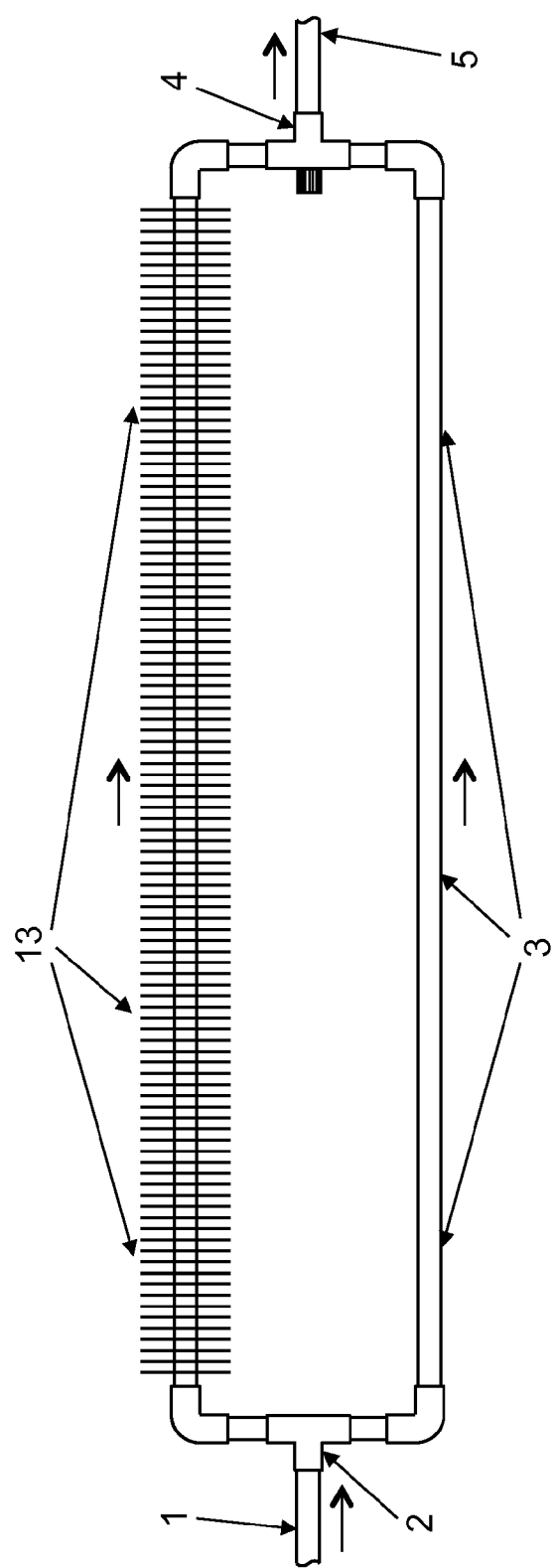
FIG. 1 shows an embodiment of the T-clip, shown without insulation for clarity.

Drawings are schematic representations and are not to scale. Arrows without associated numbers in the figures show the direction of fluid flow.

DETAILED DESCRIPTION OF THE INVENTION

1. Definitions

T-clip. "T-clip" is defined, herein, as an apparatus comprising: a flow splitter at the inlet; a thermostatic mixing valve at the outlet; two flow paths, including a high-heat-dissipating path, and a normally insulated, low-heat-dissipating path; and piping. The high-heat-dissipating flow path includes one or more heat dissipators which transfer heat to the ambient environment. The low-heat-dissipating path is piping. Flow is unidirectional and through one path or the other or both depending on the valve temperature response, in order to clip and maintain the fluid temperature when it is too high and to allow the fluid to pass unaltered in temperature when the fluid temperature is below a setpoint temperature.

Fluidic system. "Fluidic system" is defined, herein, as a system comprising fluid, components and piping that come in contact with the fluid, and components for monitoring or controlling the system. A fluidic system may be open or closed. A fluidic system may be a subsystem of a larger fluidic system.

Piping. "Piping" is defined, herein, as a system of joined and fluid-coupled fluidic conduits through which fluid may flow from one component of a fluidic system to another. Piping includes, but is not limited to, pipes, tubes, hoses, manifolds, connectors, such as a tee or elbow, and the means for joining them to each other and to components. Piping may be rigid or flexible. Piping connections may be welded, bolted-flange, threaded, soldered, union-joint, pressure-fit, fitting-type, compression-type, heat-welded, heat-soldered, clamped, glued, or accomplished with other joining methods.

Supply piping. "Supply piping" is defined, herein, when used in a the context of a fluidic system that includes a component or device for heating flowing fluid, as the piping that supplies fluid to the component or device, unless stated otherwise. A solar collector is a flowing-fluid-heating device. Connected fluid-coupled solar collectors are a flowing-fluid-heating device.

Return piping. "Return piping" is defined, herein, when used in a the context of a fluidic system that includes a component or device for heating flowing fluid, as the piping that returns fluid from the component or device, unless stated otherwise.

Flow path. "Flow path" is defined, herein, as an assembly of joined and fluid-coupled fluidic system components and piping through which fluid may flow from one component or connector to the next. A flow path may be a sub-path of a larger flow path.

Interposed. "Interposed," in reference to piping and components of a fluidic system, is defined as being inserted into, joined to, and fluid coupled to, a flow path; or being inserted between one set of components and/or piping and another set of components and/or piping, and joined to and fluid coupled to them.

Thermosyphon flow path. "Thermosyphon flow path" is defined, herein, as a flow path that includes fluid cooling to support thermosyphoning.

Thermostatic mixing valve (TMV). "Thermostatic mixing valve", or "TMV" is defined, herein, as a thermostatically controlled mixing valve. A 3-port mixing valve modulates and mixes two inlet fluid streams to produce an outlet fluid stream within a preset or field-settable temperature range depending on the temperature at the valve's temperature-sensing element which is usually at the outlet port. Mixing valves are also known as blending valves and tempering valves.

Most TMVs allow flow regardless of outlet fluid temperature. However, an anti-scald TMV also completely stops flow if the outlet fluid temperature reaches a high-limit temperature. Herein, the TMVs in the T-clip and in the example applications of the T-clip are of the type that allows flow regardless of temperature.

A TMV has two temperature setpoints, a lower temperature setpoint and a higher, upper temperature setpoint. When the temperature at the temperature-sensing element is below the lower temperature setpoint, flow is through the hot inlet port only. When the temperature at the temperature-sensing element is above the higher temperature setpoint, flow is through the cold inlet port only. When the temperature at the temperature-sensing element is between the setpoints, flow may be through both inlet ports. These setpoints may be tens of degrees apart or less than one degree apart, depending on the applications and system requirements. A TMV may have preset temperature setpoints, or may have field-adjustable temperature setpoints. Some adjustable TMVs have a fixed difference between the upper and lower setpoints, and allow one of the setpoints to be changed.

The temperature-sensing element of a TMV may be built-in or remote. TMVs may be self-acting or powered. Self-acting TMVs generally use the temperature-dependent expansion and contraction properties of special materials, such as phase-changing wax, bimetallic components, or certain fluids, and require no external power. Powered TMVs use powered valves that require an external source of power.

Thermostatic diverter valve (TDV). "Thermostatic diverter valve", or "TDV", is defined, herein, as a thermostatically controlled diverter valve. A TDV diverts flow from its inlet port to one of its outlet ports depending on the temperature at its temperature-sensing element and the setpoint temperature of the valve. Some TDVs operate in reverse, that is, the valve diverts flow from one of its INLET ports to its OUTLET port depending on the temperature at the temperature-sensing element. Some TDVs can operate either way and some can operate with flow in either direction. Some TMVs can function as TDVs. Diverter valves are also known at diverting valves.

The temperature-sensing element of a TDV may be built-in or remote. TDVs may be self-acting or powered. Self-acting TDVs generally use the temperature-dependent expansion and contraction properties of special materials, such as phase-changing wax, bimetallic components, or certain fluids, and require no external power. Powered TDVs use powered valves that require an external source of power.

Thermostatic valve. "Thermostatic valve" is defined, herein, as a thermostatically controlled valve. A 2-port thermostatic valve has one inlet and one outlet, and opens or closes depending on its setpoint temperature or temperatures and the temperature at its temperature-sensing element. For some thermostatic valves, the valve opens as the temperature increases: for other thermostatic valves, the valve closes as the temperature increases.

The temperature-sensing element of a thermostatic valve may be built-in or remote. Thermostatic valves may be self-acting or powered. Self-acting thermostatic valves generally use the temperature-dependent expansion and contraction properties of special materials, such as phase-changing wax, bimetallic components, or certain fluids, and require no external power. Powered thermostatic valves use powered valves that require an external source of power.

2. Basic Embodiment

The T-clip shown in FIG. 1 is an apparatus comprising: a fluid inlet 1; a fluid outlet 5; a flow splitter 2 at the inlet; a TMV 4 at the outlet; and two separate flow paths, a high-heat-dissipating path 13, and a normally insulated low-heat-dissipating path 3 (shown without insulation for clarity), each path connected to the splitter and to the valve through piping. The two paths are in parallel. Flow will be through one path or the other or both depending on the temperature at the temperature-sensing element of the TMV which may be at the outlet port or in close proximity to the piping after the outlet port, in order to clip and maintain the fluid temperature when it is high and to allow the fluid to pass unaltered in temperature when it is low. The splitter may be any means for admitting flow from the inlet piping and diverting flow to the flow paths, including, but not limited to, a tee, a "Y", and a manifold.

The high-heat-dissipating flow path 13 in FIG. 1 includes a finned pipe radiator component, but may include any type of heat-dissipator that rejects heat directly or indirectly to the ambient environment, including but not limited to such heat dissipators as: an automobile-type radiator, a radiator for space heating in a house, a refrigerator-type cooling coil, a plate-type heat dissipator, a finned pipe or tube, a bare pipe or tube, piping or tubing in a liquid bath, and piping or tubing passing liquid sprayers. The heat dissipator may actually be a plurality of heat dissipators connected in series, in parallel, or both. The low-heat-dissipating path 3 in FIG. 1 is piping.

Figure 2:
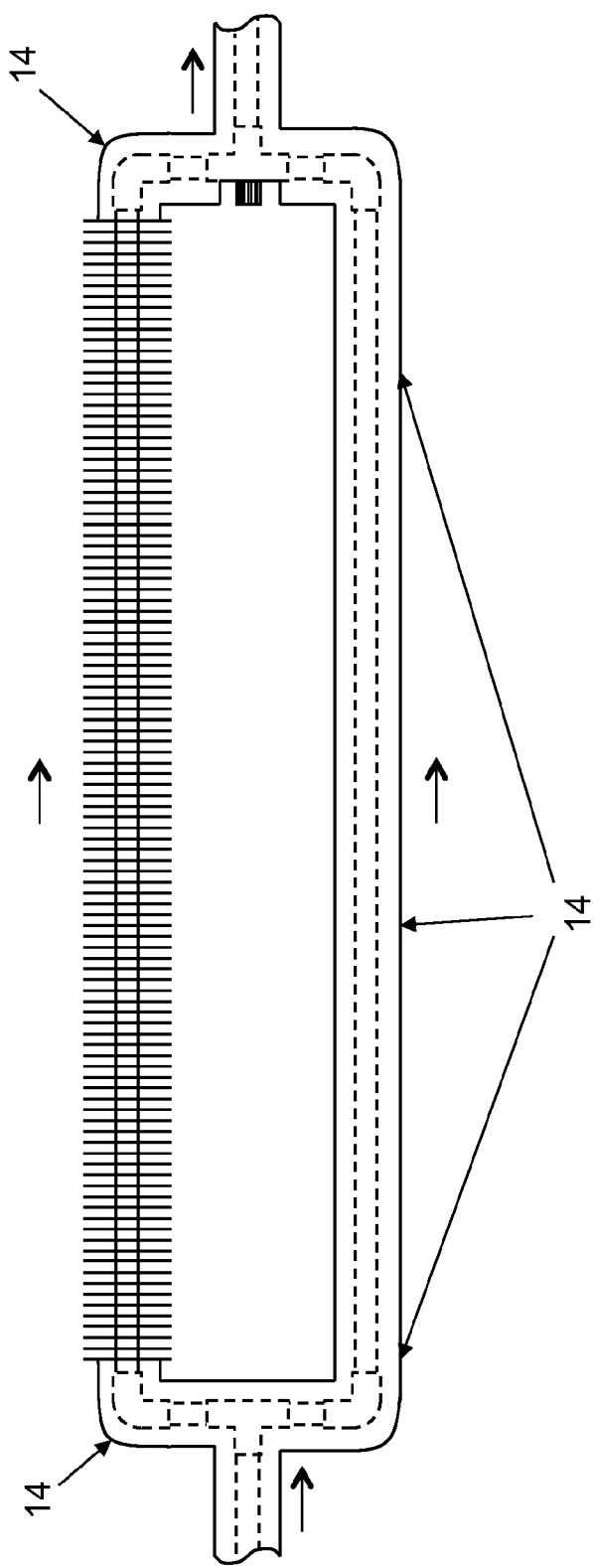
FIG. 2 shows the same embodiment as FIG. 1, but also shows insulation, with the hidden piping inside the insulation shown as dashed lines.
Figure 3:
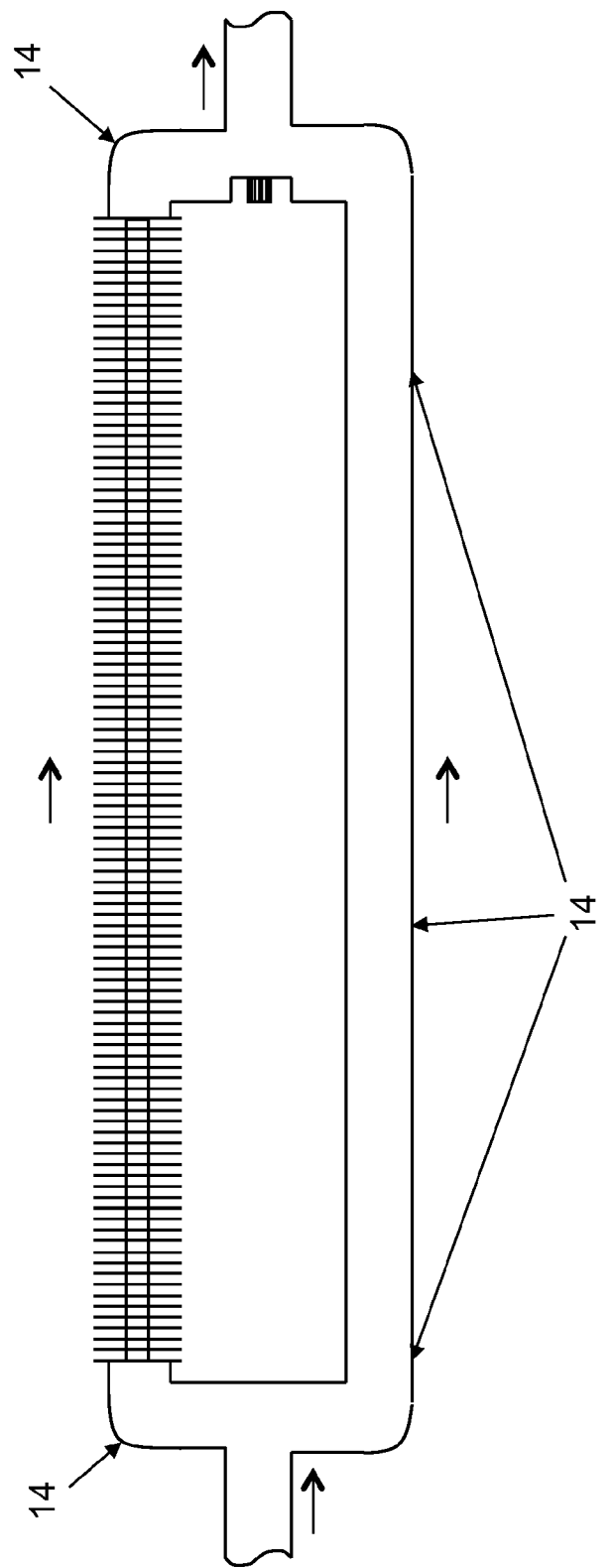
FIG. 3 shows the same embodiment as FIG. 1 and as FIG. 2, but shows the T-clip with insulation, more as it would appear to the eye.

FIG. 2 shows the same embodiment as FIG. 1, but includes insulation 14, and shows the hidden underlying piping components as dashed lines. FIG. 3 shows the same embodiment as FIG. 1 and FIG. 2, with insulation 14 and other components as they would appear to the eye. For clarity, FIGS. 1, 2 and 3 do not show an optional protective cover or an optional shade for the T-clip. The cover protects from the weather, from the environment, and against skin burns. The shade protects from the sun's rays.

When the temperature of the fluid exiting the T-clip is below the lower setpoint temperature, the TMV 4 may respond so that no, or almost no, flow is through the high-heat-dissipating flow path, and all, or almost all (admitting some possible valve leakage), of the flow is through the low-heat-dissipating path.

When the temperature of the fluid exiting the T-clip is above the upper setpoint temperature, the TMV 4 may respond so that no, or almost no, flow is through the low-heat-dissipating flow path, and all, or almost all (admitting some possible valve leakage), of the flow is through the high-heat-dissipating path.

When the temperature of the fluid exiting the TMV 4 is between the T-clip lower setpoint temperature and the T-clip upper setpoint temperature, the TMV may respond so that some of the flow is through both paths. As the fluid temperature increases from the lower to the upper setpoint temperature, fluid flow through the high-heat-dissipating path goes from 0% to 100%, while fluid flow through the low-heat-dissipating path goes correspondingly from 100% to 0%. As the temperature of the fluid at the TMV 4 changes in time, the TMV position adjusts automatically to give the proper mix. Thus, the T-clip is automatic and self-adjusting.

With the heat dissipator on the high-heat-dissipating path 13 sized to dissipate heat at a rate that is greater than or equal to the maximum heat input rate in the rest of the fluidic system beyond the T-clip and to provide a sufficient temperature decrease to actuate the TMV, the fluid temperature exiting the T-clip will be clipped and maintained between the lower and upper setpoint temperature in high temperature situations.

This allows the T-clip to be oversized, yet achieve the same fluid outlet temperature. The T-clip self-adjusts by simply allowing less flow through the high-heat-dissipating flow path and more flow through the low-heat-dissipating flow path, or vice versa, when called for. Hence, solar thermal system designers and fluidic system designers do not need to be exact in matching the size of the T-clip with the system, and may simply ensure that the T-clip for the system being designed is sized to match or exceed the maximum heat input rate. There is no performance penalty for over-sizing the T-clip and little additional cost.

The temperature setpoints are selected with respect to the operating pressure of the system of which the T-clip is a part. For example, at atmospheric pressure, a typical 50/50 mixture of propylene glycol and water will boil at about 220 degrees Fahrenheit. Calculations or testing might show that the maximum fluid temperature increase from one pass through the solar collectors at high fluid temperatures to be about 10 degrees Fahrenheit. This calls for setting the upper temperature setpoint at 210 degrees Fahrenheit or lower to preclude boiling in the solar collectors. To provide a safety margin, the design upper temperature setpoint might be set even lower, at say, 205 degrees Fahrenheit.

In an application for oil cooling for an engine or an application for hydraulic fluid cooling for machinery or an engine transmission, the upper and lower temperature setpoints are set for the optimum temperature range for fluid viscosity. In an application for cutting fluid, the upper setpoint is set at the fluid temperature for optimum cutting, and the lower setpoint temperature is set as close to that temperature as possible.

The T-clip may be designed for and installed in a new system, or be added simply and inexpensively to an existing system by identifying where in the system a limiting temperature is desired, removing a short length of piping at that location, if necessary, and interposing the T-clip. Thus, existing fluidic systems may be easily safeguarded retroactively against high temperature conditions with the insertion of a T-clip.

3. More Complex Embodiment

Figure 4:
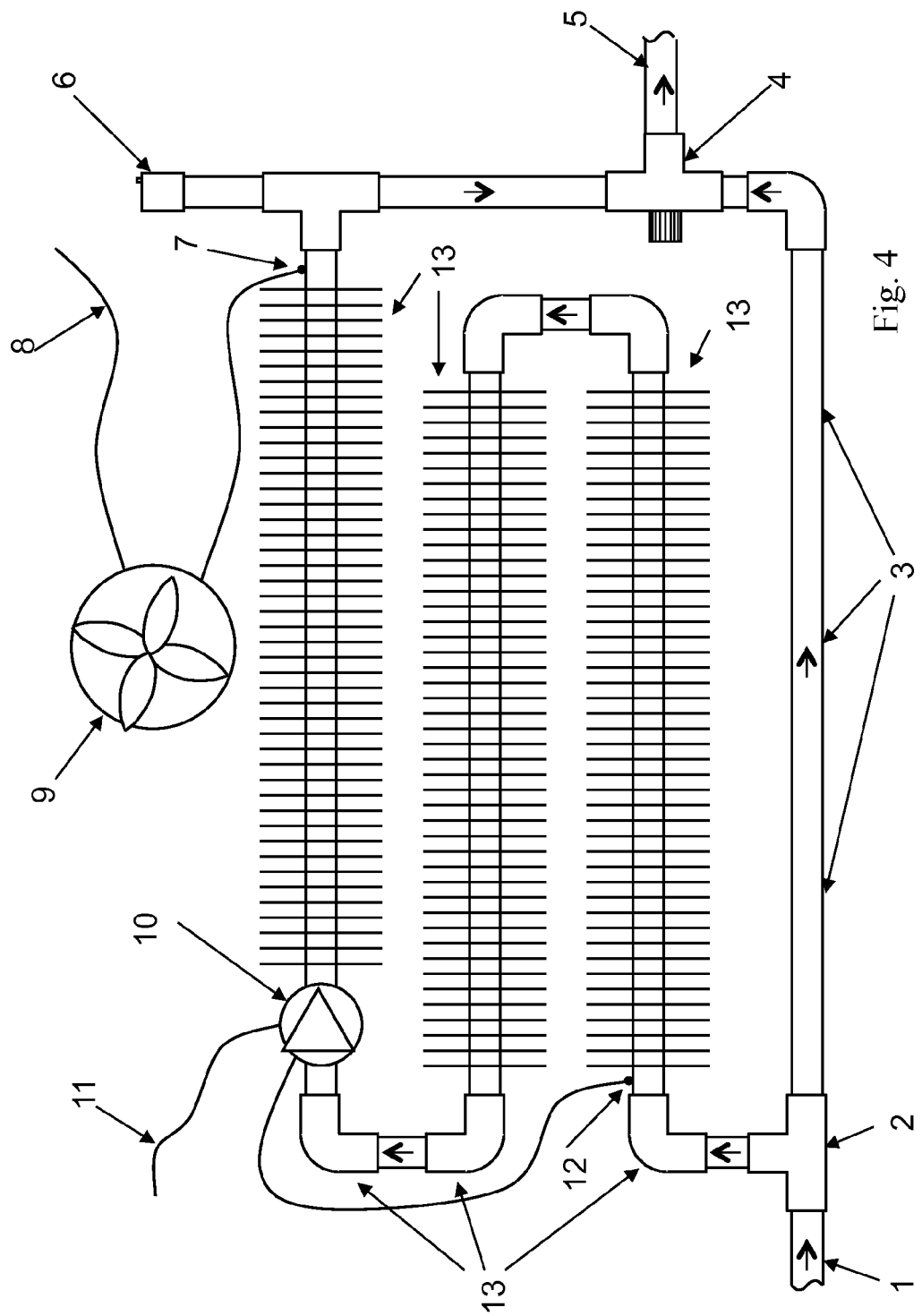
FIG. 4 shows a more complex embodiment of the T-clip that includes a high-heat-dissipating flow path that is longer than the low-heat-dissipating flow path, a thermostatically controlled pump, and a thermostatically controlled fan.

FIG. 4 shows a more complex embodiment of the T-clip, an embodiment (shown without insulation for clarity) in which the high-heat-dissipating flow path 13 is about three times longer and more tortuous than the low-heat-dissipating flow path 3. The higher pressure drop on the high-heat-dissipating path is overcome with an added thermostatically controlled pump 10. To increase heat dissipation, a thermostatically controlled fan 9 is added. To avoid flow blockages due to trapped air, gas and/or vapor, an automatic air bleed valve 6 is included. The T-clip is shown without a protective cover for clarity.

Fluid enters at the inlet 1, travels to the splitter 2, then travels along one of the two flow paths, 3 or 13, or both 3 and 13, then enters the TMV 4 and then exits at the outlet 5. The TMV's temperature-sensing element is at the TMV outlet port or in close proximity to the piping after the outlet port. The temperature sensor 7 for the thermostatically controlled fan 9 will only activate when hot fluid is flowing through the high-heat-dissipating flow path. The fan power cord is shown at 8. Likewise, the temperature sensor 12 for the electric pump 10 will only activate when hot fluid is flowing through the high-heat-dissipating flow path. The pump power cord is shown at 11. As for the basic embodiment, the high-heat-dissipating flow path of the more complex embodiment may include one or more heat dissipators connected in series, in parallel, or both. The splitter may be any means for admitting flow from the inlet piping and diverting flow to the flow paths, including, but not limited to, a tee, a "Y", and a manifold.

4. How to Make the T-Clip

First, the location in the fluidic system where flow is unidirectional and a temperature limit is required or desired is identified. The lower and upper T-clip setpoint temperatures above ambient are determined for the application. A TMV, with its temperature-sensing element at its outlet port or on the piping after the outlet port, is selected with these setpoints and the proper piping connections. The maximum heat input rate for the system is calculated or derived from testing. The heat dissipator for the high-heat-dissipating flow path is selected and sized with a heat rejection rate under extreme, most stressing conditions, including the maximum ambient temperature, that meets or exceeds the maximum system heat input rate or the maximum heat rate the T-clip may experience. The heat dissipator is sized even larger, if necessary, to produce the minimum temperature decrease or more through the heat dissipator needed to actuate the TMV. In practice, T-clips may be pre-made with heat dissipators and TMV temperature setpoints matched to the temperature and heat rejection rate requirements of the applications.

The pressure drop for working fluid passage through the heat dissipator is determined. As long as the pumps in the system are capable of overcoming this pressure drop and the other pressure drops in the system, the piping for the low-heat-dissipating flow path may be selected to give the same pressure drop. Thus, flow rate through the T-clip will be the same regardless of which flow path is being utilized during operation. This is a best mode for the T-clip.

A flow splitter is selected for compatibility with the piping connections. The TMV is joined to piping to the heat dissipator component and to the piping for the low-heat-dissipating flow path with compatible piping connectors, as shown in FIGS. 1-4. In a similar fashion, the flow splitter is joined to piping to the other ends of the heat dissipator component and to the piping for the low-heat-dissipating flow path with compatible piping connectors, as shown in FIGS. 1-4. All components are then joined together.

Insulation, if desired or necessary for the application, is applied to the T-clip except to its heat dissipator. A protective cover and/or a shade may be included.

The completed T-clip is delivered, and installed in the identified position and connected in-line with the system piping, with the flow splitter at the inlet and the TMV at the outlet as shown in FIGS. 1-4. The space around the T-clip must be adequately ventilated.

5. In-Line Application

Figure 5:
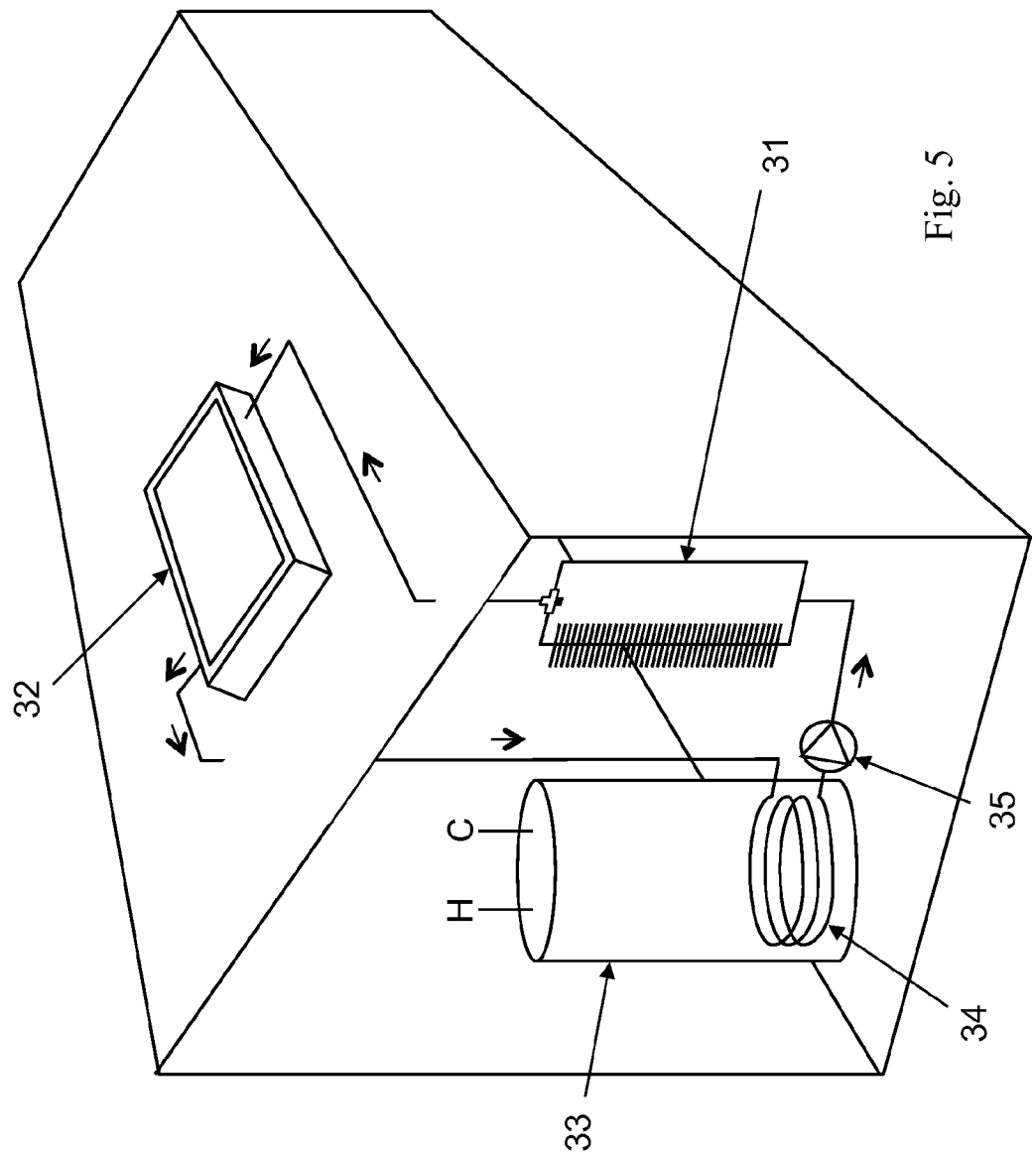
FIG. 5 shows a solar thermal application of the T-clip inside a house that limits the temperature of the fluid entering the downstream solar collector.

FIG. 5 shows an inside-the-house application of the T-clip on a simplified closed-loop indirect solar thermal system for domestic hot water heating. The T-clip 31 is interposed in the supply piping before the solar collector 32, that is, upstream of the solar collector, with no other temperature-altering system component or temperature-altering piping between the two. The working fluid exits the solar collector 32 on the roof and travels to a heat exchanger 34 inside the hot water tank 33 where heat is transferred to the water. The working fluid then travels to the pump 35, then to the T-clip 31, and then back to the solar collector 32. If the temperature of the fluid entering the T-clip is above the predetermined upper setpoint temperature, the T-clip decreases the temperature back down to between the lower and upper temperature setpoints. This upper temperature setpoint is selected so that the solar collector cannot add enough heat to the fluid during a single pass through the solar collector to bring the working fluid to a boil or to its breakdown temperature. The lower temperature setpoint is set as close to the upper setpoint as possible. The splitter is at the bottom of the T-clip 31 and the TMV is at the top in FIG. 5. The T-clip is shown without a protective cover or a shade for clarity. When sufficient space is available inside the house for the T-clip, it may be included in the solar thermal system design and installation for a new house, or included in a retrofit solar thermal system installation for an existing house, or added to an existing solar thermal system in an existing house. Ventilation around the T-clip is required.

Figure 6:
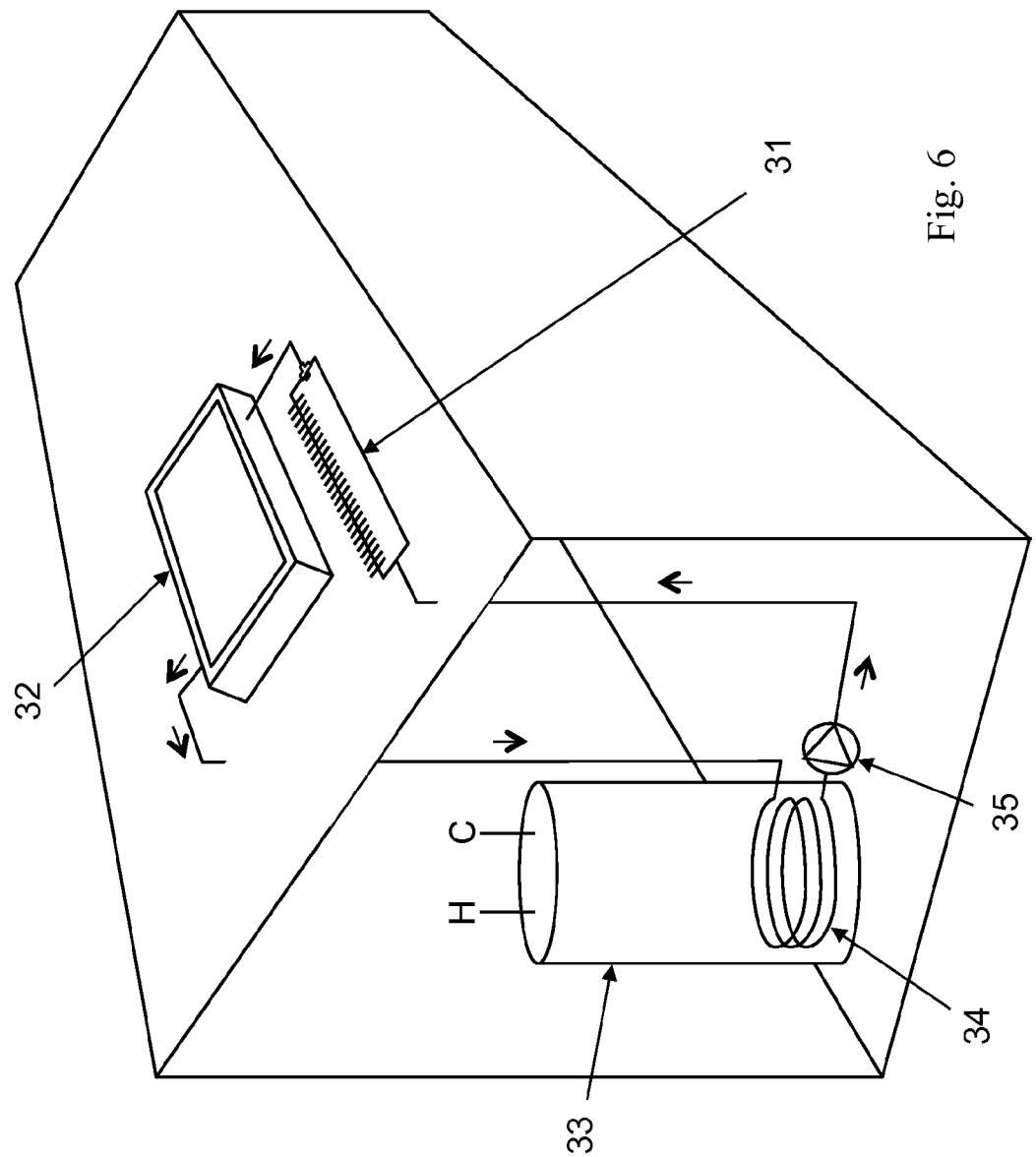
FIG. 6 shows the same type of application of the T-clip as in FIG. 5, but with the T-clip outside the house.

FIG. 6 shows an outside-the-house application of the T-clip on a simplified closed-loop solar thermal system for domestic hot water. The only difference between FIG. 5 and FIG. 6 is that the T-clip is outside on the roof, but still before the inlet to the solar collector. However, because the ambient temperature on the roof may be higher, the T-clip may have to be sized larger.

In another similar application (not shown, but analogous to the applications shown in FIGS. 5 and 6) of a T-clip in a solar thermal system, the T-clip is interposed in the return piping of the solar thermal system and used to limit the high temperature of the fluid in the storage tank, thus providing a high temperature control function for the tank. The T-clip setpoint temperatures are set as close as possible to the tank upper temperature limit. Hence, working fluid entering the heat exchanger in the hot water tank is at the tank upper limit temperature or lower. This application of the T-clip works not only for tanks, but for any downstream device with an upper temperature limit. The tank or device high limit temperature and the T-clip setpoint temperatures are required to be above the ambient air temperature around the T-clip. Ventilation around the T-clip is also required. In this application, the T-clip is providing an upper temperature limit control function as well as overheat protection.

A T-clip interposed in the supply piping, as shown in FIGS. 5 and 6, may provide both functions, as well. The T-clip upper setpoint temperature is set instead to a value that is the tank or device high limit temperature minus the maximum fluid temperature increase in a single pass through the solar collector.

When sized larger, a T-clip can service a plurality of solar collectors.

6. Application: Integration into Solar Collector

Figure 7:
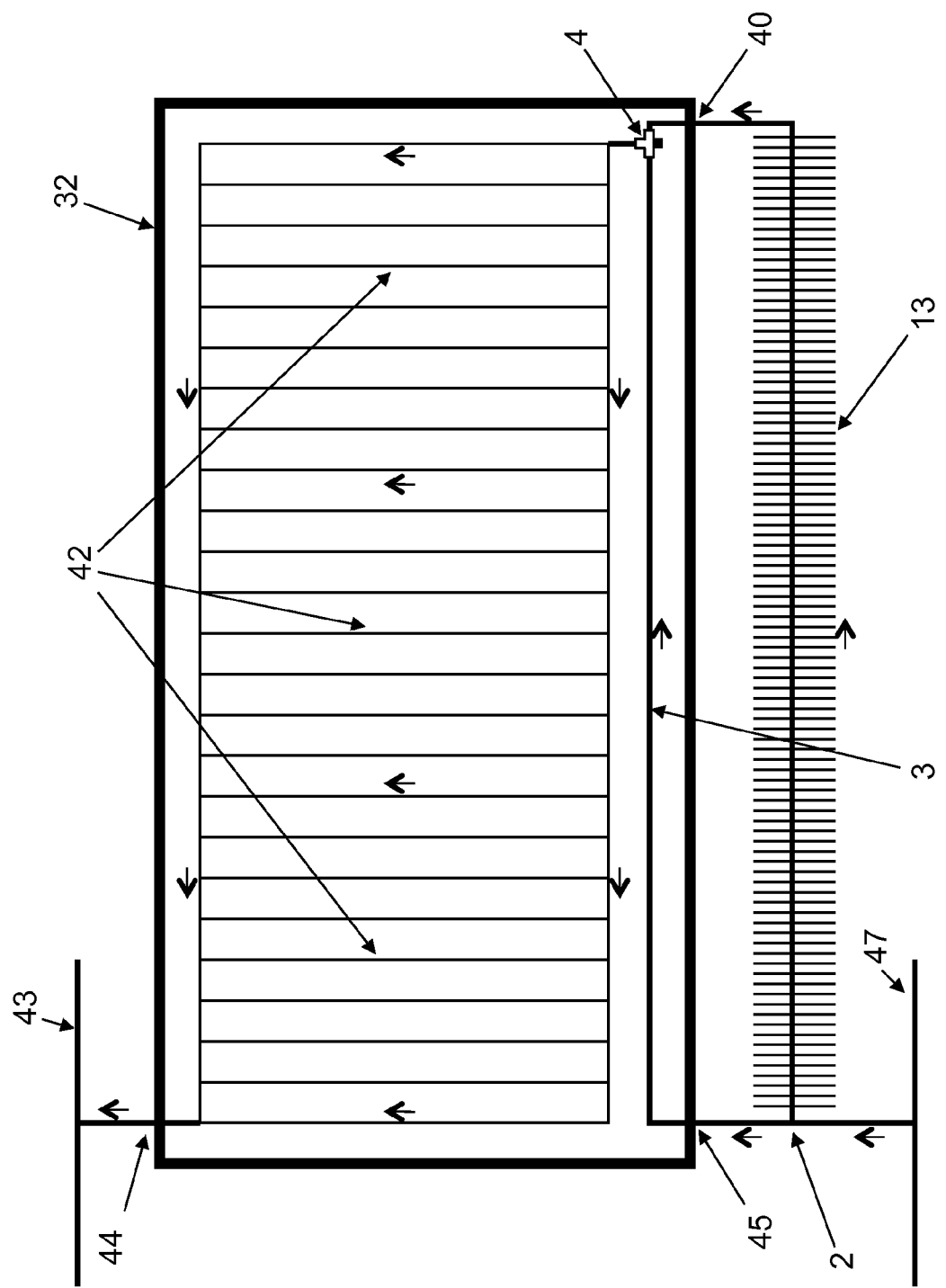
FIG. 7 shows an application of the T-clip integrated into a flat plate solar collector.

FIG. 7 shows an application of the T-clip to a flat plate solar collector. The T-clip is integrated into the solar collector 32 which in this example application has vertical heat-absorbing fluid channels 42. Essentially, half the T-clip is inside the solar collector, and half outside, and the two solar collector inlets 45 and 40 are the dividing points. The splitter and the high-heat-dissipating flow path are outside the solar collector, and the low-heat-dissipating flow path and the TMV are inside the solar collector. T-clip components inside the solar collector are not insulated.

Fluid flow comes from the supply piping header 47, to the splitter 2 of the T-clip, then to either the high-heat-dissipating flow path 13 or the low-heat-dissipating flow path 3 or both. The high-heat-dissipating flow path 13 may be positioned below the collector, behind the collector or elsewhere adjacent to the solar collector. The protective cover on the high-heat-dissipating flow path 13 is not shown for clarity. An access into the solar collector may be included to allow turning an adjustment knob on an adjustable TMV 4 from outside the solar collector.

When the temperature at the temperature-sensing element of the TMV 4 is below the lower temperature setpoint, fluid enters the solar collector at the inlet 45 and travels along the low-heat-dissipating path 3 to the TMV 4. When the temperature at the temperature-sensing element of the TMV 4 is above the upper temperature setpoint, fluid travels along the high-heat-dissipating path 13, enters the solar collector at the inlet 40, and then continues to the TMV 4. Otherwise, the fluid may travel through both paths 3 and 13. The upper temperature setpoint is selected and set so that even with the flowing fluid picking up the maximum amount of heat while flowing through the solar collector, the fluid temperature will not reach the fluid breakdown temperature or the fluid boiling point in the solar collector. The lower temperature setpoint is selected as close to the upper temperature setpoint as possible. The TMV setpoints must be higher than the highest ambient air temperature expected plus some margin.

Another application (not shown) for this temperature-limiting flat-plate solar collector is as an upper temperature limiter for a fluid storage tank heated directly or indirectly by the solar thermal system. The T-clip upper temperature setpoint is set to a temperature that is the temperature limit for the tank minus the maximum fluid temperature increase in a single pass through the solar collector. The T-clip lower setpoint temperature is set as close as possible to the upper setpoint temperature. The T-clip setpoint temperatures are required to be above the ambient air temperature around the T-clip. Ventilation around the T-clip is also required. In this application, the T-clip is providing an upper temperature limit control function as well as overheat protection.

7. Application to Fluid Tanks

Figure 8:
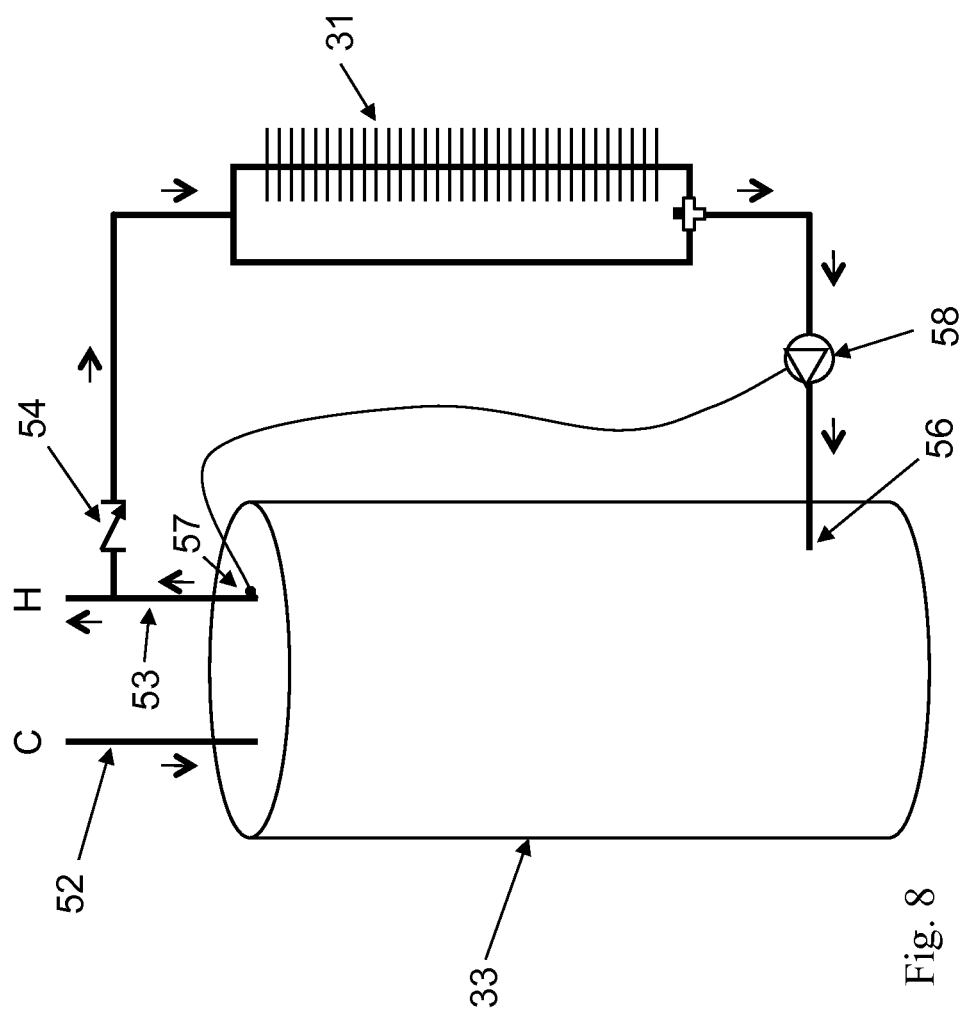
FIG. 8 shows an application of the T-clip that is used to limit and maintain the temperature of the fluid in a tank.

FIG. 8 shows an application of the T-clip to a hot water storage tank. Some fluid tanks, including hot water tanks driven by solar heating, need to be kept at or below a high-limit temperature. This example application of the T-clip does this, and avoids wasting water and overcooling the tank.

In FIG. 8, all piping, valves and connectors outside the tank are well insulated except for the high-heat-dissipating flow path of the T-clip 31 and the cold inlet 52 to the tank 33. The T-clip 31 is attached to, adjacent to, or in close proximity to the tank 33. When the water temperature exceeds the high-limit temperature for the tank at the temperature sensor 57, the thermostatically controlled pump 58 turns on and moves water from the hot water tank outlet 53 to the drain valve opening 56. The water moves from the top of the tank out the hot outlet 53, through a check valve 54, through a T-clip 31 and through a pump 58 before returning to the tank at the drain outlet 56. In FIG. 8, the splitter is at the top of the T-clip 31, and the TMV is at the bottom of the T-clip 31. The upper temperature setpoint of the T-clip is set at the high-limit temperature, and the lower temperature setpoint of the T-clip is set as close to the upper as possible. The water returning to the tank is near the high-limit temperature. Insulation is not shown in FIG. 8 for clarity. The space around the T-clip must have adequate ventilation for heat dissipation. Though this particular application is for a hot water storage tank, it works for any type of fluid tank containing fluid compatible with the external flow path and its components.

Figure 9:
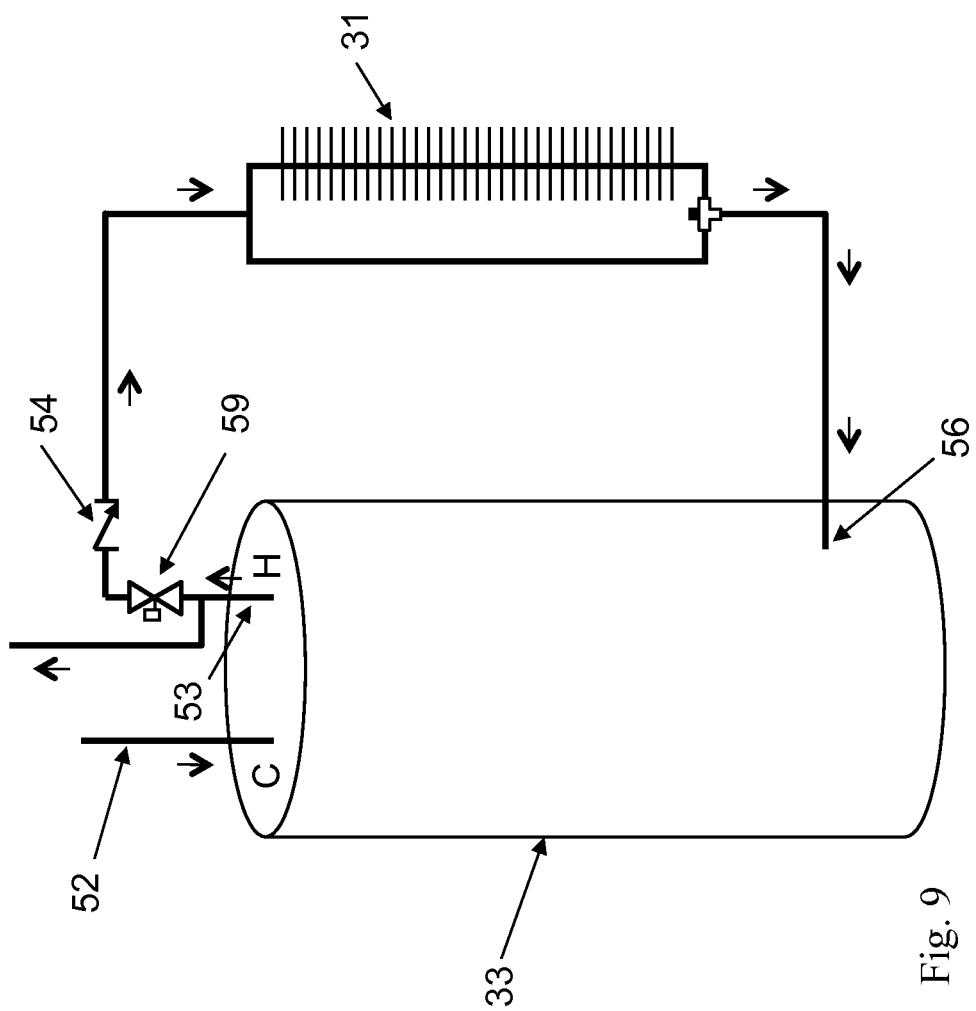
FIG. 9 also shows an application of the T-clip that is used to limit and maintain the temperature of the fluid in a tank without electricity or external controls.

FIG. 9 shows the same type of application of the T-clip as in FIG. 8, except that this application is thermosyphon-driven instead of pump-driven. The T-clip 31 is attached to, adjacent to, or in close proximity to the tank. The temperature-sensing element of the thermostatic valve is in close proximity to the piping at the tank outlet 53. When the temperature at the temperature-sensing element of the thermostatic valve 59 is above its setpoint temperature, the normally closed thermostatic valve 59 opens to fluid-couple the external flow path with the tank. Fluid flows by thermosyphon from the tank outlet 53, through the thermostatic valve 59, through a check valve 54, through the T-clip 31, and back to the tank at 56. Alternatively, the check valve 54 may be placed downstream of the T-clip. When cooling has been sufficient, the low-heat-dissipating flow path through the T-clip 31 is the only open path, and when the average density of the fluid along that path is approximately the same as the average density of corresponding fluid in the tank, thermosyphoning stops.

One skilled in the art knows that the pressure drops along a thermosyphon flow path must be kept to a minimum. In order to boost thermosyphoning, the high-heat-dissipating flow path of the T-clip 31 may be approximately the height of the tank to ensure a lower temperature, higher density column of fluid. The T-clip may be located above the tank, as well. Further, the T-clip may be elongated to extend above the tank if needed to boost thermosyphoning. Insulation, not shown in the FIG. 9 for clarity, is included on all but the high-heat-dissipating flow path of the T-clip and the cold water inlet to the tank. This application when implemented without external power requirements is simple, does not require electric power, does not require an external control system, and does not waste water.

8. Application to Solar Collectors

Figure 10:
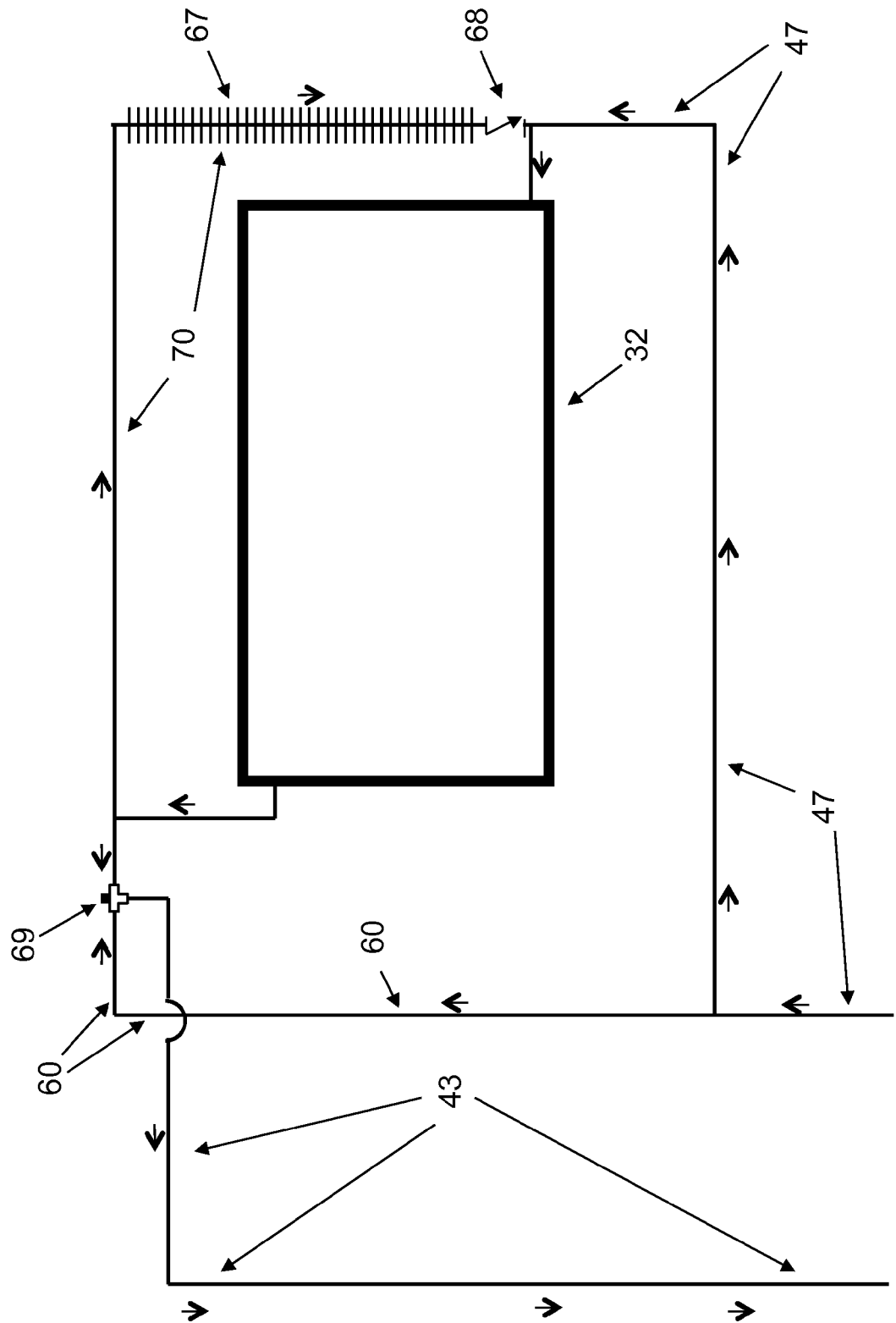
FIG. 10 shows an apparatus for thermosyphon cooling of a solar collector.

FIG. 10 shows an apparatus for thermosyphon cooling of a solar collector 32 for overheat protection in all flow situations, comprising: a "thermosyphon flow path" 70, a bypass flow path 60, a means for diverting flow thermostatically 69, shown as a reverse TDV, piping and connectors. The thermosyphon flow path 70, includes a heat dissipator 67, a check valve 68, piping and connectors, and is interposed between the outlet and the inlet of the solar collector 32. One choice for check valve 68 is a pressure-differential-sensitive, one-way swing check valve that is closed when system fluid is flowing and otherwise open by gravity or other simple, reliable means. To support thermosyphoning, pressure drops along the thermosyphon flow path are kept to a minimum and the coldest section of the thermosyphon flow path 70 is non-horizontal. The bypass flow path 60, includes piping and connectors, and is interposed between the system supply piping 47 and one of the inlet ports of the TDV 69. The TDV 69 has two inlet ports and one outlet port, and diverts flow to the return piping 43 depending on the temperature of its temperature-sensing element located in close proximity to the piping from the solar collector outlet, from either a) the solar collector 32 or b) the bypass flow path 60. All piping and connectors outside the solar collector are well insulated except for the thermosyphon flow path 70. For protection against fluid boiling and breakdown, the TDV temperature setpoint may be set a number of degrees below the lower of the fluid breakdown temperature and the fluid boiling point.

In full system flow situations, whether arising by design, by accident, by failure or fault, fluid flows from the supply piping 47, bypasses the closed check valve 68 and the thermosyphon flow path 70, flows through the solar collector 32, flows through the TDV 69, and then flows to the return piping 43. The bypass flow path 60 is blocked at the TDV 69 because the fluid temperature at the TDV's temperature-sensing element is lower than its setpoint temperature. No flow goes through the thermosyphon flow path 70 nor the bypass flow path 60. Should the temperature at the temperature-sensing element of the TDV exceed the TDV setpoint temperature, the TDV acts to open the bypass flow path, allowing bypass flow from the supply piping to the return piping, and to isolate the solar collector and the thermosyphon flow path from system fluid flow, thus allowing thermosyphoning to commence to cool the fluid from the solar collector. This is an isolation situation. The system pump is still running, and system fluid flow continues through the supply piping, the bypass flow path, and the return piping, but no solar heat is being added to this flow path.

In no-system-flow situations, whether arising by design, by accident, by failure or fault, the check valve 68 opens and/or remains open. The density difference between the hotter fluid in the solar collector 32 and the cooler fluid in the thermosyphon flow path 70 creates a differential pressure and hence a thermosyphon that moves fluid from the solar collector 32 to the heat dissipator 67, through the now open check valve 68, and then back into the solar collector 32. Thus, the fluid moves by thermosyphon, and the fluid from the solar collector is cooled.

In partial system flow situations, whether arising by design, by accident, by failure or fault, the check valve 68 closes and/or remains closed. In the transition from full flow to partial flow, fluid flow is at first the same as for full flow. However, because the dwell time for the fluid in the solar collector is longer, the temperature increase in fluid flowing through the solar collector may be larger. The temperature at the temperature-sensing element of the TDV may increase. Once the temperature at the temperature-sensing element reaches its temperature setpoint, system flow is diverted through the bypass flow path 60, resulting in isolation of the solar collector and the thermosyphon flow path 70. On isolation, thermosyphoning begins and cools the fluid in the solar collector as it passes through the thermosyphon flow path. In time, the temperature at the temperature-sensing element of the TDV 69 falls below its temperature setpoint and the valve diverts flow from its other inlet port, the port allowing flow from the solar collector to the return piping. Thus, system flow through the bypass flow path stops, and system flow through the solar collector re-commences. If the partial system flow situation continues, this alternating cycle continues, the fluid is cooled, and overheating in the solar collector is prevented.

With the setpoint temperature of the TDV 69 at or below the high-limit temperature for a connected storage tank, the apparatus provides the additional function of tank temperature limiting.

Figure 11:
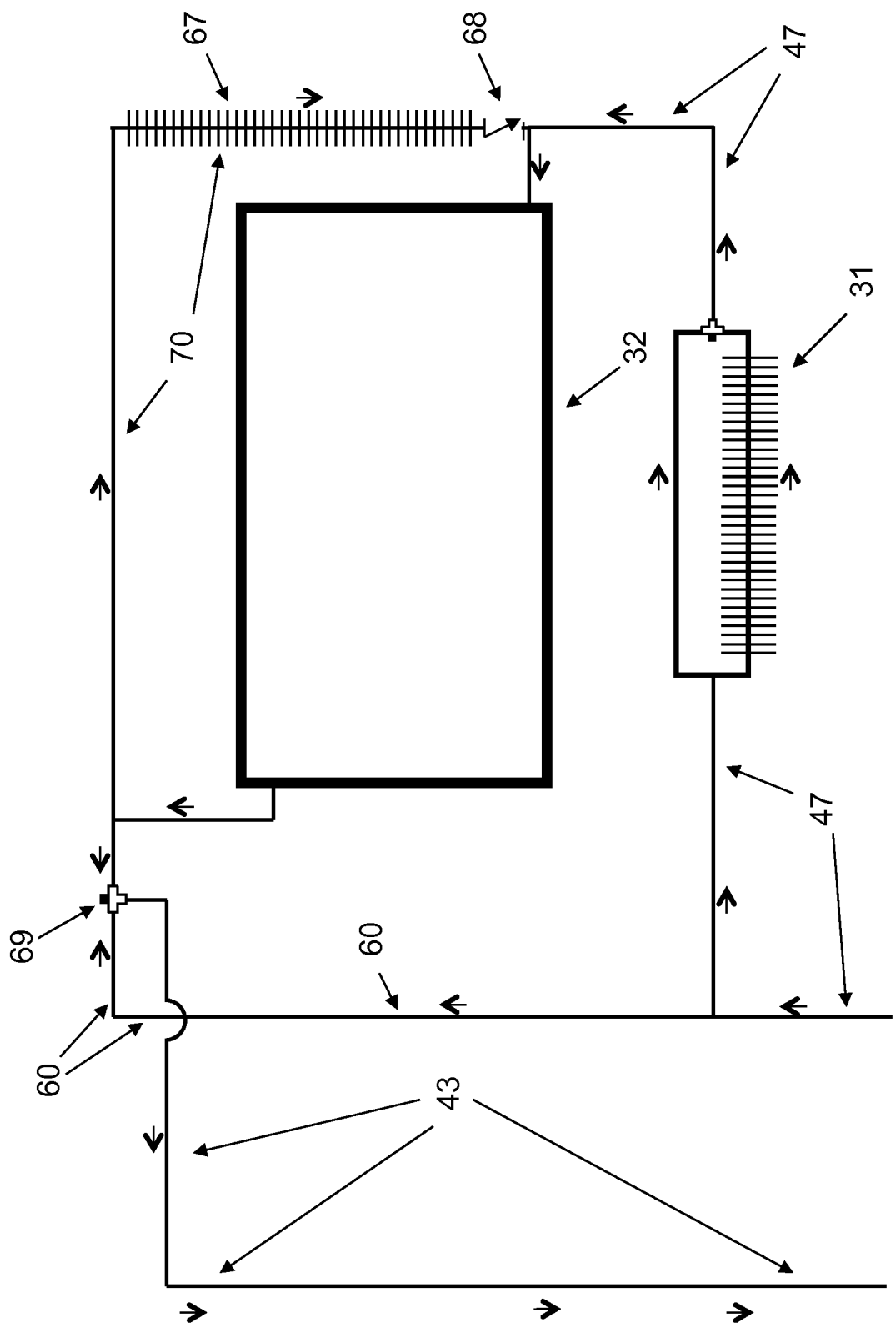
FIG. 11 shows an application of the T-clip integrated into the apparatus for thermosyphon cooling and interposed in the supply piping.

The addition of a T-clip to the apparatus shown in FIG. 10 improves the apparatus. FIG. 11 shows such an improved apparatus. As shown in FIG. 11, the T-clip is interposed in the supply piping to the solar collector. With the TDV set for overheat protection only, and the T-clip upper setpoint temperature set to the TDV setpoint temperature minus the maximum fluid temperature increase in a single pass through the solar collector minus a few degrees margin, the T-clip reduces the frequency of TDV valve cycling in full flow situations. With a T-clip upper setpoint temperature set instead to the system storage tank temperature limit minus the maximum fluid temperature increase in a single pass through the solar collector minus a few degrees margin, the T-clip reduces the frequency of TDV valve cycling in full flow situations and, in addition, limits the temperature of the fluid in the storage tank.

Figure 12:
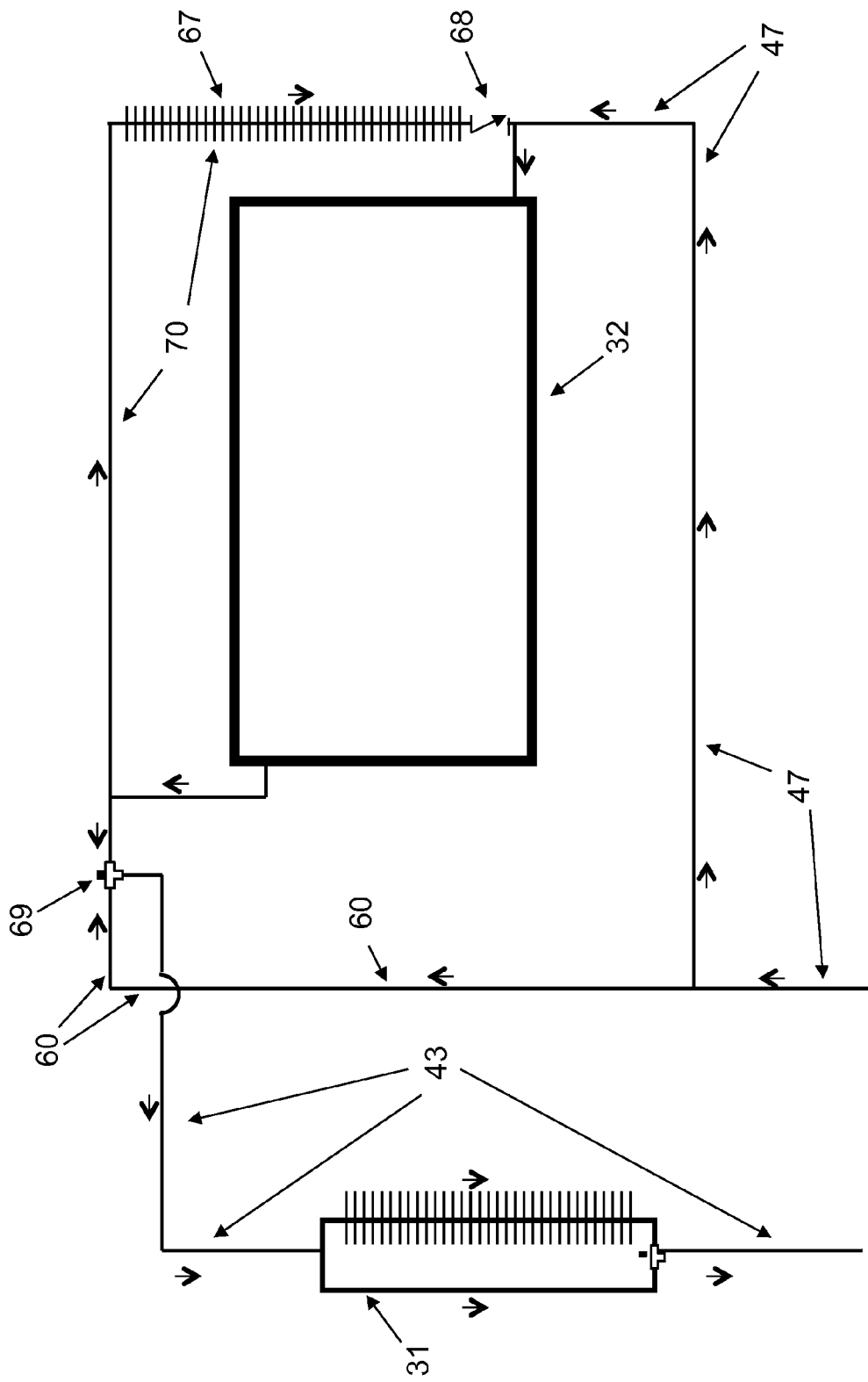
FIG. 12 shows an application of the T-clip integrated into the apparatus for thermosyphon cooling and interposed in the return piping.

FIG. 12 shows the addition of a T-clip to the apparatus shown in FIG. 10, but now interposed in the return piping. The T-clip setpoint temperatures may be set to near the tank upper temperature limit. Hence, working fluid in a solar thermal hot water system entering the heat exchanger in the hot water tank is at the tank upper limit temperature or lower. The tank limit temperature and the T-clip setpoint temperatures are required to be above the ambient air temperature around the T-clip. Ventilation around the T-clip is also required. In this application, the T-clip is providing an upper temperature limit control function as well as overheat protection and is reducing the frequency of TDV valve cycling in full flow situations.

With regard to FIGS. 10, 11 and 12, means for providing unidirectional flow are included in the apparatus where necessary depending on the geometry of the installation, as well as means for releasing air, gas or vapor. Insulation is included on all but the heat dissipator of the thermosyphon flow path and the heat dissipator of the T-clip. The thermosyphon flow path 70 may have multiple flow paths and/or multiple heat dissipators for higher heat rejection rates. The heat dissipator of the thermosyphon flow path 70 may be elongated vertically and the top of the thermosyphon flow path 70 may extend above the solar collector outlet to support thermosyphoning. A configuration with vertically elongated heat dissipator(s) also has an insulated riser from the solar collector outlet to the same height as the thermosyphon flow path. One choice for check valve 68 is a pressure-differential-sensitive, one-way swing check valve that is closed when system fluid is flowing and otherwise opens by gravity or other simple, reliable means. The TDV may be replaced with other thermostatically controlled valve options, including but not limited to, a TMV.

Figure 13:
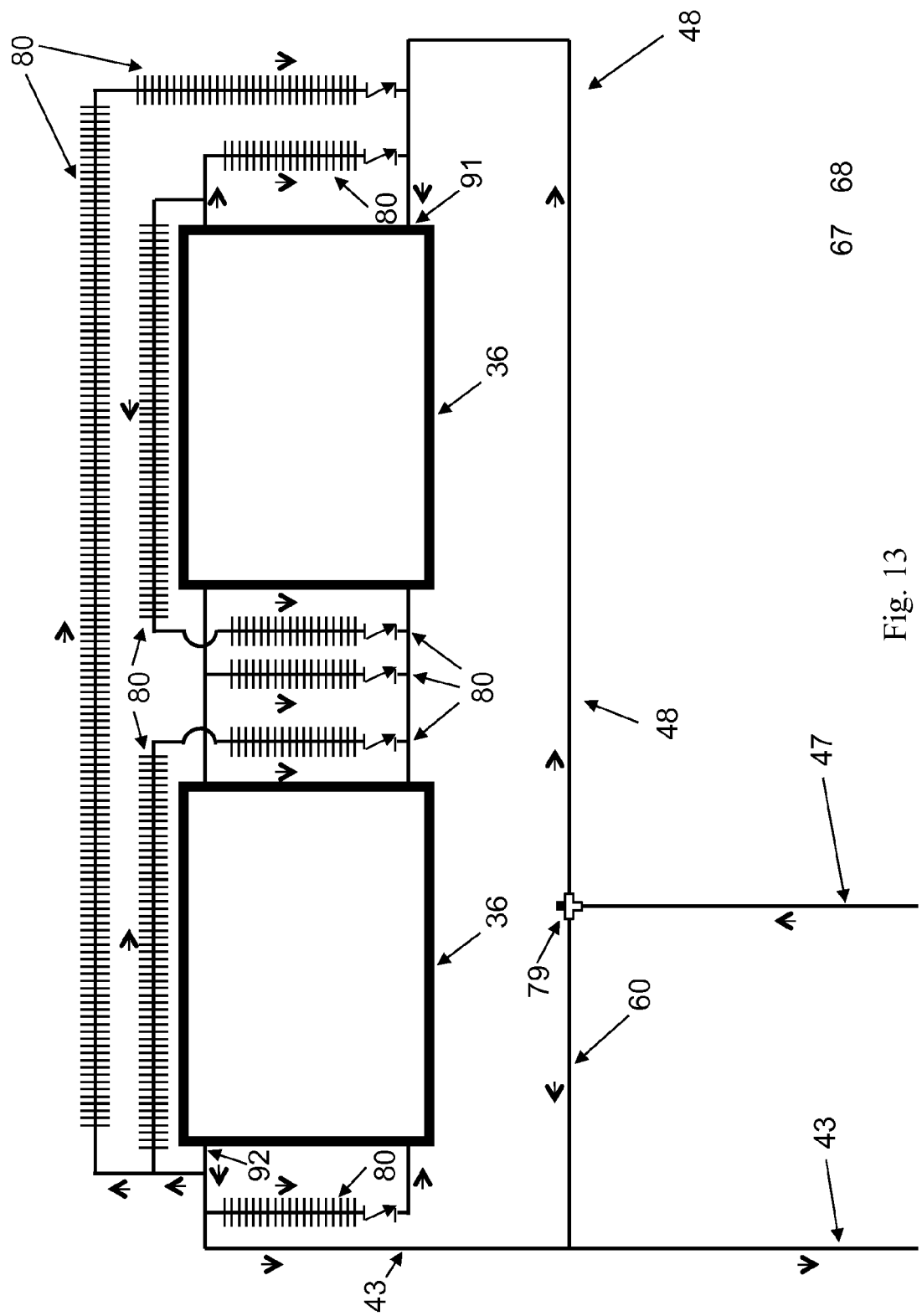
FIG. 13 shows an alternative apparatus for cooling for overheat protection for two connected solar collectors.

An alternative apparatus to those shown in FIGS. 10, 11 and 12, is a similar apparatus in which the means for diverting flow thermostatically is interposed in the supply piping instead of in the return piping. FIG. 13 illustrates such an apparatus and also illustrates methods of utilizing multiple thermosyphon flow paths for two or more connected solar collectors or for a single solar collector.

FIG. 13 shows an apparatus for thermosyphon cooling of two connected, fluid-coupled solar collectors 36 for overheat protection in all flow situations, comprising: thermosyphon flow paths 80, a bypass flow path 60, a means for diverting flow thermostatically 79, usually a TDV, piping and connectors. The solar collectors 36 have horizontal internal headers (not shown) typical of most flat plate collectors with vertical internal risers. However, the apparatus works for any type of solar collector and piping arrangement, not just the type and piping arrangement in FIG. 13, in which pressure drops are minimized to support thermosyphoning and heat dissipators are sized for the heat load. Each thermosyphon flow path 80, includes a heat dissipator, a check valve, piping and connectors, and is interposed between a solar collector's outlet or piping extension of its outlet or outlet header and a solar collector's inlet or piping extension of its inlet or inlet header. One choice for check valve 68 is a pressure-differential-sensitive, one-way swing check valve that is closed when system fluid is flowing and otherwise open by gravity or other simple, reliable means. The bypass flow path 60, includes piping and connectors, and is interposed between the system return piping 43 and one of the outlet ports of the TDV 79. The TDV 79 diverts flow from the supply piping 47 depending on the temperature of its temperature-sensing element to either a) the solar collectors' inlet piping 48 or b) the bypass flow path 60. The temperature sensor for the TDV 79 may be located in close proximity to the piping at the outlet 92 of the solar collectors or located internal to the TDV. The solar collectors' inlet piping 48 leads to the inlet 91 to the solar collectors.

In full system flow situations, whether arising by design, by accident, by failure or fault, fluid flows from the supply piping 47, through the TDV 79, through the inlet piping 48, through the inlet headers and extensions, through the solar collectors 36, through the outlet headers and extensions, and into the return piping 43. The check valves on the thermosyphon flow paths 80 are closed by differential pressure. The bypass flow path 60 is blocked at the TDV 79 because the fluid temperature at the TDV's temperature-sensing element is lower than its setpoint temperature. No flow goes through the thermosyphon flow paths 80 nor the bypass flow path 60. Should the temperature at the temperature-sensing element of the TDV exceed the TDV setpoint temperature, the TDV acts to open the bypass flow path, allowing bypass flow from the supply piping to the return piping, and to isolate the solar collectors and the thermosyphon flow paths from system fluid flow, thus allowing the check valves of the thermosyphon flow paths 80 to open and thermosyphoning to commence to cool the fluid from the solar collectors. This is an isolation situation. The system pump is still running, and system fluid flow continues through the supply piping, the bypass flow path, and the return piping, but no solar heat is being added to this flow path.

In no-system-flow situations, whether arising by design, by accident, by failure or fault, the check valves on the thermosyphon flow paths 80 open and/or remain open. The density difference between the hotter fluid in the solar collectors 36 and the cooler fluid in the thermosyphon flow paths 80 creates a differential pressure and hence a thermosyphon that moves fluid from the solar collectors 36 to the thermosyphon flow paths, through the heat dissipators, through the now open check valves, and then back into the solar collectors 36. Thus, the fluid moves by thermosyphon, and the fluid from the solar collectors is cooled.

In partial system flow situations, whether arising by design, by accident, by failure or fault, the check valves on the thermosyphon flow paths 80 close and/or remain closed. In the transition from full flow to partial flow, fluid flow is at first the same as for full flow. However, because the dwell time for the fluid in the solar collectors is longer, the fluid temperature increase in flowing through the solar collectors may be larger. The temperature at the temperature-sensing element of the TDV may increase. Once the temperature at the temperature-sensing element reaches its temperature setpoint, system flow is diverted through the bypass flow path 60, resulting in isolation of the solar collectors and the thermosyphon flow paths 80. On isolation, thermosyphoning begins and cools the fluid in the solar collectors as it passes through the thermosyphon flow paths 80. In time, the temperature at the temperature-sensing element of the TDV 79 falls below its temperature setpoint and the valve diverts flow back to the solar collectors' inlet piping 48. Thus, system flow through the bypass flow path stops, and system flow through the solar collectors re-commences. If the partial system flow situation continues, this alternating cycle continues, the fluid is cooled, and overheating in the solar collectors is prevented.

An apparatus that is self-acting is the best mode as this mode provides passive protection without external power, the most reliable protection. The same apparatus and methods as above apply to solar collectors with external headers. The addition of a T-clip (not shown) to one or more of the return piping, the inlet piping, the outlet piping, or the supply piping of the apparatus shown in FIG. 13 improves the apparatus as described above. Means for providing unidirectional flow throughout are included where necessary depending on the geometry of the installation, as well as means for releasing air, gas or vapor. Insulation is included on all but the thermosyphon flow paths and the heat dissipators of the T-clips. Each thermosyphon flow path may have multiple flow paths and/or multiple heat dissipators for higher heat rejection rates. The heat dissipators of the thermosyphon flow paths 80 may be elongated vertically and the top of the thermosyphon flow paths 80 may extend above the solar collectors outlet to support thermosyphoning. Another apparatus similar to that shown in FIG. 13 may include fewer or more thermosyphon flow paths than shown in FIG. 13 depending on heat rejection requirements and other considerations.

Figure 14:
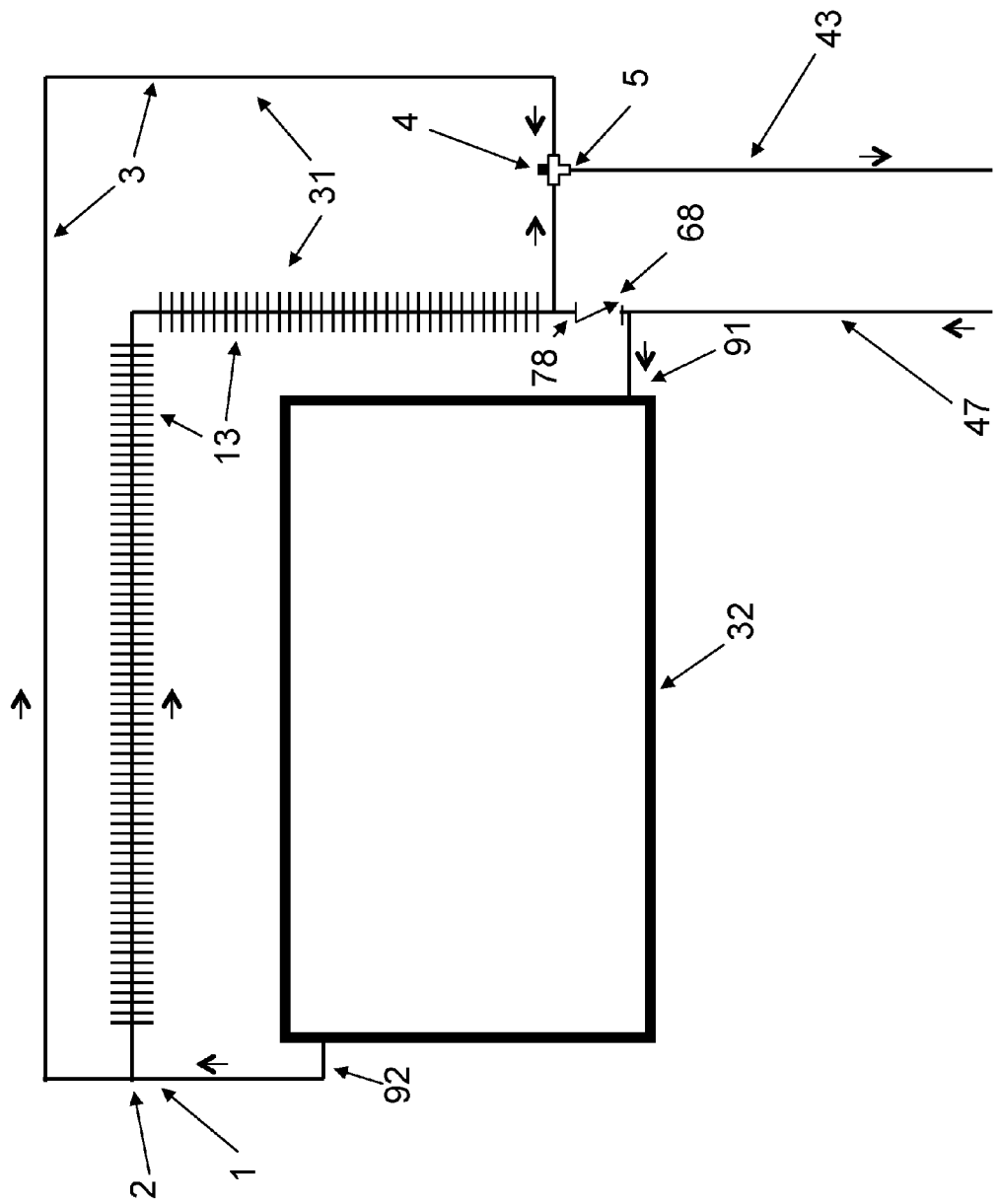
FIG. 14 shows a direct application of the T-clip for cooling for overheat protection for a solar collector.

FIG. 14 shows a schematic of an apparatus that is an application of the T-clip apparatus for overheat protection in all flow situations. In this apparatus the T-clip apparatus is modified by the addition of a spur flow path. The T-clip apparatus 31 is interposed between the outlet 92 of the solar collector and the return piping 43, with the T-clip apparatus inlet connected to the solar collector outlet 92. A spur flow path 78 is interposed between a) the T-clip apparatus high-heat-dissipating flow path upstream of the thermostatic mixing valve and downstream of the heat dissipator and b) the inlet piping 91 to the solar collector. The spur flow path 78 includes a pressure-differential-sensitive one-way check valve 68. One choice for check valve 68 is a one-way swing check valve that is closed when system fluid is flowing. Equivalently, the apparatus of FIG. 14 can be described more fundamentally without citing the T-clip apparatus per se. A fluid inlet 1 is interposed between the solar collector outlet 92 and a flow splitter 2. A low-heat-dissipating flow path 3 is interposed between the flow splitter 2 and a thermostatic mixing valve 4. A high-heat-dissipating flow path 13 is also interposed between the flow splitter 2 and the thermostatic mixing valve 4. A spur flow path 78 is interposed between a) the high-heat-dissipating flow path 13 upstream of the thermostatic mixing valve 4 and downstream of the heat dissipator of the high-heat-dissipating flow path 13 and b) the inlet piping 91 to the solar collector. The spur flow path 78 includes a check valve 68. The outlet 5 of the thermostatic mixing valve 4 is interposed between the thermostatic mixing valve 4 and the return piping 43.

In full and partial system flow situations, whether arising by design, by accident, by failure or fault, the fluid flows from the supply piping 47, does not flow through the spur flow path 78 because of the closed check valve 68, flows through the inlet piping 91 of the solar collector, flows through the solar collector 32, flows through the outlet piping 92, flows through the T-clip apparatus 31, and then flows to the return piping 43. The T-clip apparatus limits the temperature of the fluid entering the return piping during full and partial system flow situations. Equivalently, the functioning can be described more fundamentally without citing the T-clip apparatus. In full and partial system flow situations, whether arising by design, by accident, by failure or fault, the fluid flows from the supply piping 47, does not flow through the spur flow path 78 because of the closed check valve 68, flows through the inlet piping 91 of the solar collector, flows through the solar collector 32, flows through the outlet piping 91, flows through the inlet piping 1 to the flow splitter 2, flows through the low-heat dissipating flow path 3 or the high-heat-dissipating flow path 13 or both according to the thermostatic mixing valve 4, flows through the thermostatic mixing valve 4, flows through the outlet 5 and into the return piping 43.

In no-system-flow situations, the check valve 68 opens and/or remains open. Thermosyphoning circulates the fluid from the solar collector 32, through the solar collector outlet 92, through the inlet 1 to the flow splitter 2, through the high-heat-dissipating flow path 13, through the spur flow path 78 with the now open check valve 68, through the solar collector inlet 91, and back into the solar collector. By such flow, fluid in the solar collector is cooled, and the temperature of the fluid in the solar collector is limited.

Figure 15:
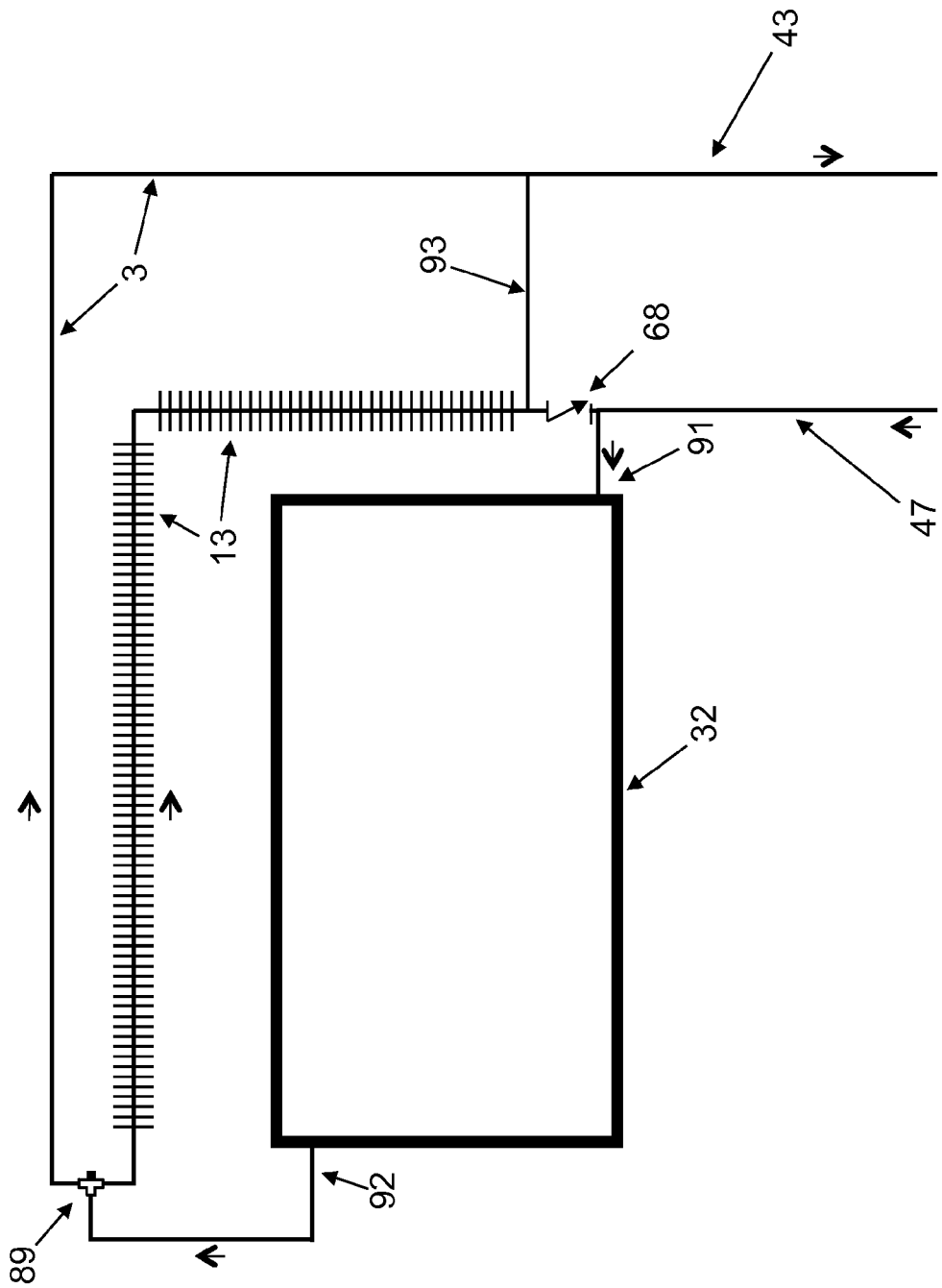
FIG. 15 shows a similar apparatus to that in FIG. 14 but utilizing a TDV instead for cooling for overheat protection for a solar collector.

FIG. 15 shows an apparatus similar to the apparatus shown in FIG. 14 that also limits the fluid temperature in a solar collector in all system flow situations. A means for diverting flow thermostatically 89, usually a TDV, at or near the solar collector outlet 92 diverts flow to either a low-heat-dissipating flow path 3 or a high-heat-dissipating flow path 13 depending on the temperature of the fluid at the TDV temperature sensor which may be internal or remote at the solar collector outlet 92. The low-heat-dissipating flow path 3 is interposed between the TDV 89 and the return piping 43. Connector piping 93 is interposed between the outlet of the high-heat-dissipating flow path 13 and the return piping 43. A spur flow path that includes a pressure-differential-sensitive one-way check valve 68 is interposed between the outlet of the high-heat-dissipating flow path 13 and the solar collector inlet piping. One choice for check valve 68 is a one-way swing check valve that is closed when system fluid is flowing and otherwise open by gravity or other simple, reliable means.

In full and partial system flow situations, whether arising by design, by accident, by failure or fault, the fluid flows through the inlet piping 47, bypasses the closed check valve 68, flows into the solar collector inlet 91, flows through the solar collector 32, flows out the solar collector outlet 92, flows through the TDV 89, flows through either the low-heat-dissipating flow path 3 or the high-heat-dissipating flow path 13 and connector piping 93, and then flows to the return piping 43. The apparatus may reduce the temperature of the fluid entering the return piping.

In no-system-flow situations, the check valve 68 opens and remains open. Thermosyphoning circulates the fluid from the solar collector through the apparatus and back to the solar collector. If the fluid temperature at the TDV 89 temperature sensor is initially above the TDV setpoint temperature, fluid flows from the TDV 89 through the high-heat-dissipating flow path 13, through the check valve 68, through the solar collector and back to the TDV. By such flow, the temperature of the fluid in the solar collector is reduced. If the fluid temperature remains above the TDV setpoint temperature, this flow continues. However, if the fluid temperature drops below the TDV setpoint temperature, the TDV 89 diverts flow to the low-heat-dissipating flow path 3. If the fluid density in the solar collector is less than the fluid density in the low-heat-dissipating flow path 3 thermosyphoning continues with flow continuing through the low-heat-dissipating flow path 3, through the connector piping 93, through the check valve 68, through the solar collector 32, through the TDV 89, and back into the low-heat-dissipating flow path 3. If the fluid density in the solar collector is greater than or equal to the fluid density in the low-heat-dissipating flow path 3, thermosyphoning stops, but as the fluid in the solar collector warms its density decreases and when the density difference is sufficient, thermosyphoning recommences. If the fluid temperature then rises above the TDV setpoint temperature, the TDV switches back to diverting flow through the high-heat-dissipating flow path 13. By such alternating flow regimes, the temperature of the fluid in the solar collector is limited.

If the fluid temperature is initially below the TDV setpoint temperature, fluid initially flows from the TDV 89 through the low-heat-dissipating flow path 3, through the connector piping 93, through the check valve 68, through the solar collector 32, and back to the TDV 89. In time, the fluid temperature may rise to the point where the TDV 89 switches to diverting flow to the high-heat-dissipating flow path 13. Over time, the TDV diversion may vary and thermosyphoning may stop and start, and by such alternating flow regimes, the temperature of the fluid in the solar collector is limited.

As discussed above and as illustrated in FIGS. 10 through 13 additional cooling capacity may be gained with additional thermosyphon flow paths and T-clips for the apparatus shown in FIG. 15. With an extended apparatus and additional thermosyphon flow paths and T-clips, multiple connected solar collectors may be protected from overheating in all flow situations.

The apparatus for each application above, except for risers where needed, may be packaged adjacent to or around the edges of the solar collector, and the assembly including the solar collector and the apparatus is low profile when flush-mounted on a roof. Sized larger, and/or with multiple thermosyphon flow paths, the apparatus may be used for multiple connected solar collectors as well as for a single solar collector. Risers may be added to provide greater thermosyphoning. Some solar collectors, such as evacuated tube solar collectors, and some installations of solar collectors, such as those with a low pitch angle, may require an extended apparatus with an insulated riser pipe extending the solar outlet piping upward to provide a longer vertical hot fluid section to promote thermosyphoning. The apparatuses above may be applied to thermosyphon-type hot water heating systems also, in which the storage tank is above the solar collector. The best modes for the apparatuses above are those that do not require external power for operation.

The balance of the solar thermal systems not shown in FIGS. 10 through 15 may include, but is not limited to, a pump, an expansion tank, a heat exchanger, valves, a storage tank, air bleed valves, piping, connectors, and a control system. One skilled in the art will realize that the overheat protection apparatuses shown in FIGS. 10 through 15 may be applied to other types of flowing-fluid-heating devices beside solar collectors. These include, but are not limited to, a nuclear reactor, a chemical reactor, a water jacket around a chemical reactor, and a heat exchanger connected to any of them.

9. Application to Fluidic Systems

Any of the apparatuses above for flowing-fluid-heating device overheat protection, when combined with a flowing-fluid heat-sink temperature limiter apparatus near the system flowing-fluid heat sink may provide overall overheat protection, overcooling protection, and a simple control system for the fluidic system.

Figure 16:
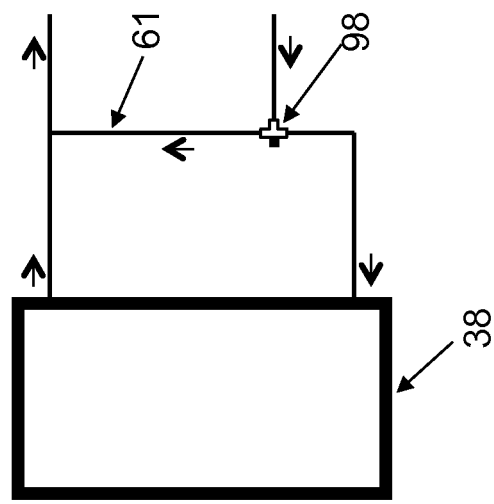
FIG. 16 shows an apparatus for overheat protection of a flowing-fluid heat sink.

FIG. 16 shows a flowing-fluid heat-sink temperature limiter apparatus comprising a bypass flow path 61, a means for diverting flow thermostatically 98, usually a TDV, and piping. The apparatus is interposed between the inlet piping and the outlet piping of the heat sink 38, which may be a fluid storage tank or a heat exchanger connected to a fluid storage tank, among other such heat sinks System fluid flow is either through the flowing-fluid heat sink 38 or through the bypass flow path 61. The sensor for the TDV 98 is on or in the heat sink 38. In practice, this temperature sensor may be located in a sensor well in a fluid storage tank, attached to the storage tank wall, attached to the secondary side of a heat exchanger, or other. Fluid flows into the TDV 98 from the supply piping to the flowing-fluid heat sink. If the TDV sensor temperature is below the TDV setpoint, usually the maximum desired temperature for the flowing-fluid heat sink, fluid flows to and through the heat sink 38, then to the return piping from the heat sink. If the TDV sensor temperature is at or above the TDV setpoint, fluid flows to and through the bypass flow path 61, then to the return piping from the heat sink, thus avoiding further heating of the heat sink. Excess heat remains in the balance of the fluidic system to be dumped by any of a variety of means including those described above. So, in all flow situations, with protection for the flowing-fluid-heating device and for the flowing-fluid heat sink, overheating is prevented for both. A fluidic system with a solar collector or collectors and a heated fluid storage tank may thus be protected from overheating in all flow situations. A flowing-fluid heat-sink temperature limiter apparatus that is self-acting is the best mode as this provides passive protection without the need for external power, the most reliable protection. One-way check valves (not shown) are included where needed for a particular installation.

Figure 17:
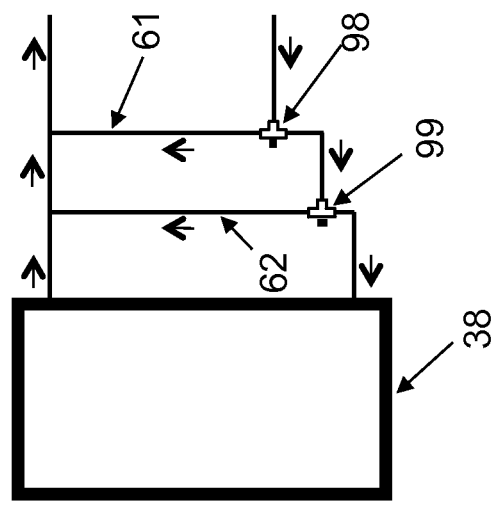
FIG. 17 shows an apparatus for overheat protection and cooling protection for a flowing-fluid heat sink.

FIG. 17 shows an improved flowing-fluid heat-sink temperature limiter apparatus that also provides overcooling protection by adding components to those shown in FIG. 16. The improved apparatus includes a second bypass flow path 62 and a second means for diverting flow thermostatically 99, usually a TDV. The temperature sensor for the TDV 99 may be internal to the TDV. The TDV 99 is interposed between/among the bypass flow path 62, the piping from the first TDV 98, and the inlet piping to the heat sink. The bypass flow path 62 is interposed between the TDV 99 and the return piping from the heat sink.

If the first TDV 98 diverts fluid toward the heat sink 38 and not toward the first bypass 61, the fluid next encounters the second TDV 99. If the temperature of the fluid entering the second TDV 99 is below the TDV's setpoint, the TDV diverts flow through the second bypass flow path 62 and to the return piping from the heat sink. Otherwise, fluid flow continues to and through the flowing-fluid heat sink 38, then to the return piping from the heat sink. Fluid with a temperature lower than the second TDV setpoint is not allowed to interact with and potentially cool the fluid in the heat sink. For example, for a second TDV 99 set at 100 degrees F., in the early morning at start of daily solar heating the circulating fluid will usually be below 100 degrees F. If the tank were to already be at 100 degrees F., then flow through the heat sink could potentially cool the fluid in the storage tank. However, this flow is prevented until the circulating fluid reaches 100 degrees F. The second TDV prevents tank overcooling when the circulating fluid temperature is below 100 degrees F. and the storage tank is above 100 degrees F. When the circulating fluid temperature is above 100 degrees F., and the storage tank temperature is higher than the circulating fluid temperature, some tank fluid cooling may occur but it will be less cooling than would be without the second TDV.

TDV 98 and TDV 99 may be interchanged for the same functionality. An improved flowing-fluid heat-sink temperature limiter apparatus that is self-acting is the best mode as this provides passive protection without the need for external power, the most reliable protection. If overheat protection for the heat sink is not required, but overcooling protection is desired, the apparatus may include just the bypass flow path 62 and the means for diverting flow thermostatically 99, piping and connectors. One-way check valves (not shown) are included where needed.

Any of the apparatuses above for flowing-fluid-heating device overheat protection may be combined with an improved flowing-fluid heat-sink temperature limiter apparatus in a fluidic system to provide overall overheat protection, overcooling protection, and a simple thermal control system for the fluidic system.

For a solar thermal fluidic system, the balance of the system not shown in FIGS. 16 and 17 may include, but is not limited to, a solar collector, a pump, an expansion tank, a heat exchanger, valves, a storage tank, air bleed valves, piping, connectors, a control system and a solar collector overheat protection apparatus. One skilled in the art will realize that the overheat protection apparatuses shown in FIGS. 10 through 17 may be applied to other types of flowing-fluid-heating devices besides solar collectors and other types of flowing-fluid heat sinks besides storage tanks and heat exchangers.

10. Other Applications

The T-clip has application to other areas where fluidic system temperature limiting is required or desired, including but not limited to, fluidic systems for engine oil, engine coolant, transmission fluid, cutting fluid, machining fluid, hydraulic fluid and tank fluid.

Figure 18:
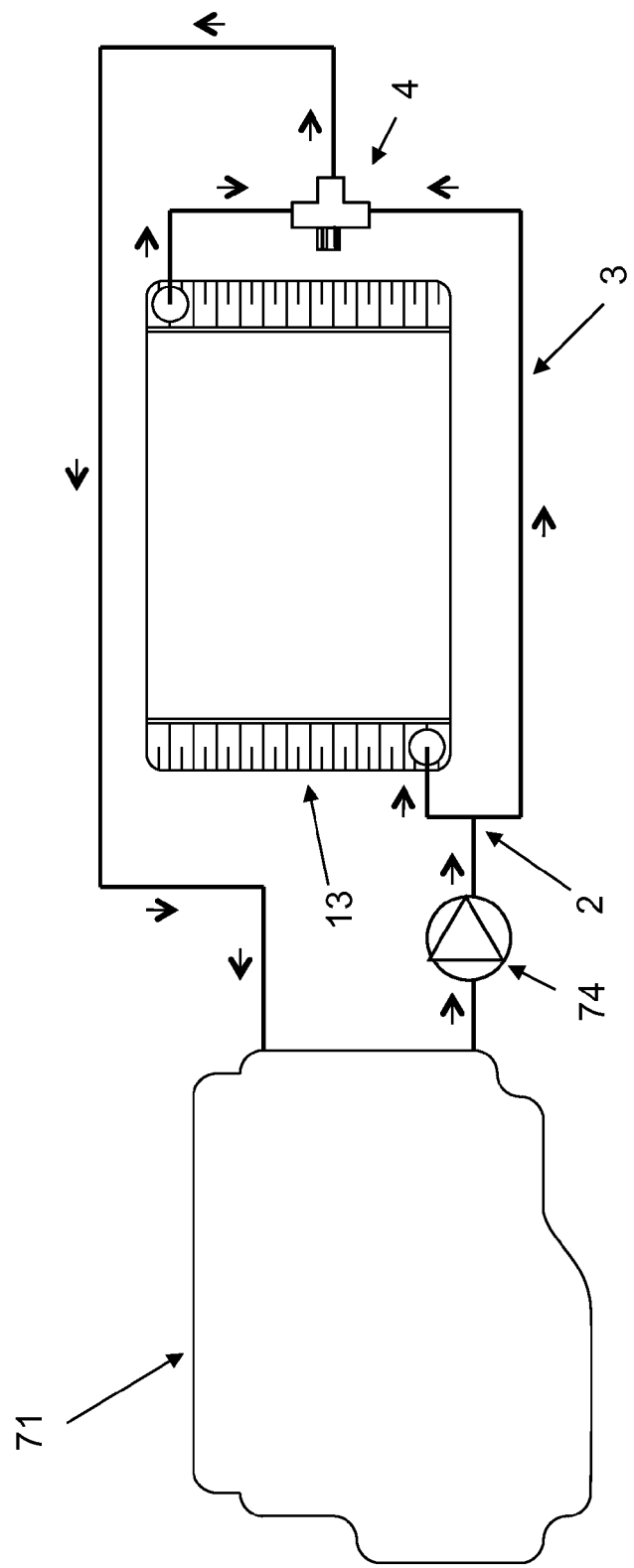
FIG. 18 shows an application of the T-clip to an engine cooling system.

To illustrate a specific application of the T-clip in these other areas, FIG. 18 shows a simplified engine coolant system. The engine need only have an inlet port and an outlet port with piping connectors for its internal coolant channels. The pump 74 moves coolant from the engine 71 to the splitter 2 of the T-clip. Flow continues to the high-heat-dissipating flow path including the radiator 13, and/or the low-heat-dissipating flow path 3, according to the valve position at the TMV 4 of the T-clip. The coolant then moves from the TMV 4 back into the engine 71, and the cycle repeats. For a cold engine, coolant flow will bypass the high-heat-dissipating flow path 13 because the coolant temperature will be below the setpoint temperatures, thus providing for faster engine warm up. As the engine warms, when the coolant temperature at the TMV 4 reaches the lower setpoint temperature, the TMV 4 will begin to mix in some flow through the high-heat-dissipating flow path 13 which includes the radiator to maintain the temperature of the coolant re-entering the engine within the setpoint temperatures. Thus, overcooling is prevented, also. The requirement for a fan (not shown) for boosting heat dissipation from the radiator is unchanged by the inclusion of a T-clip. A bypass flow path to the heater core for heating a passenger compartment, an expansion tank fluid reservoir, a pressure relief valve, and other components unnecessary to illustrate the T-clip are not shown for clarity. This application of the T-clip is most advantageous for an electric coolant pump mounted away from the engine, as some automakers are starting to do. The TMV may be mounted away from the engine for greater accessibility and easier servicing compared with most of today's thermostatic valves which are integrated into the engine block or head. No external sensors are required to maintain the temperature of the coolant re-entering the engine within its optimum range. Alternatively, the pump may be interposed in the return piping to the engine.

11. Best Modes

The best mode of the T-clip is its design and construction in which: the T-clip's upper setpoint temperature is selected and set to the desired or required temperature limit; the T-clip's lower setpoint temperature is selected and set appropriate for the application; the high-heat-dissipating flow path is sized to reject heat at a rate that exceeds the highest anticipated heat load from the balance of the system beyond the T-clip when the fluid temperature is at the upper temperature setpoint and to provide a sufficient temperature decrease to actuate the TMV; the pressure drop for high-heat-dissipating flow path is the same as for the low-heat-dissipating flow path; the pressure drop for each path is minimized; no electricity or external power is required; and the protective cover, if needed, is in place. This best mode has the highest reliability because of its simplicity. Keeping the pressure drops for the flow paths low and equal eliminates the need for additional pumps and associated external pumping power.

The best mode for the application of the T-clip in a solar thermal system to prevent fluid breakdown and boiling in flowing fluid in the solar collectors is the design and construction of the solar thermal system in which: the T-clip is placed before the inlet to the solar collector to regulate the temperature of the fluid entering the solar collector, with no other fluid-temperature-altering system component on the flow path to the solar collector; the upper setpoint temperature for the T-clip is set so that in a single pass through the solar collectors at high fluid temperatures the heat added to the fluid in the solar collector cannot bring the fluid temperature to the fluid breakdown temperature or fluid boiling point at the operating pressure of the system; the lower setpoint temperature for the T-clip is set as close as possible to the upper setpoint temperature; the T-clip is designed and built with the high-heat-dissipating flow path sized to dissipate heat at a rate that exceeds the highest anticipated heat load when the fluid temperature is at the upper temperature setpoint for the T-clip and to provide a sufficient temperature decrease to actuate the TMV; the T-clip is designed and built with the pressure drop for high-heat-dissipating flow path the same as for the low-heat-dissipating flow path; the T-clip is designed and built with the pressure drop for each path minimized; the T-clip is designed and built to require no electric power; and the protective cover, if needed, is in place. This mode is the most effective for preventing fluid breakdown and fluid boiling in the solar collector, and has the highest reliability because of its simplicity.

Other applications have best modes, also, which includes optimum placement of the T-clip between the components of the fluidic system, the choice of temperature setpoints, low and balanced pressure drops, and minimum electrical power requirements.

For engine applications, the best mode is interposing the T-clip in the piping before the oil or coolant re-enters the engine. This allows for the fluid to be maintained and used in the engine at the optimum temperature and viscosity for optimum fluid performance inside the engine. In addition, the best mode includes selection of the upper and lower temperature setpoints that keep the fluid viscosity in the optimum range.

For transmission fluid applications, the best mode is the interposing of the T-clip in the piping before the fluid returns to the transmission.

For hydraulic applications, the best mode is after the pump and before fluid branching and distribution to the valves and pistons which require a small range of viscosity, and hence temperature, as viscosity is temperature dependent. So, the actuators, valves, and pistons, will have the proper temperature hydraulic fluid for optimum operation and long service life. In addition, the best mode includes selection of the upper and lower temperature setpoints that keep the viscosity in the optimum range.

For tank temperature limiter applications, the best mode is to take the overheated fluid from the top or outlet of the tank and return fluid at, or very close to, the high-limit temperature, to the bottom of the tank. The external flow path includes the T-clip and the pump. The upper temperature setpoint is set at the tank high-limit temperature, and the lower temperature setpoint is set as close to the upper as possible.

For cutting fluid system applications, the best mode is to move just used and possibly overheated fluid from the catch basin reservoir and move it through a T-clip with the upper and lower setpoint temperatures set for the optimum temperature for the cutting fluid and the application.

For the highest reliability and simplicity, balanced and minimized pressure drops and minimum power requirements complete the best mode description for the T-clip The best mode for the thermosyphon cooling apparatuses includes self-acting thermostatically controlled valves and design layout that allows the solar collector to be low profile when flush mounted to a roof.

It will be appreciated by one skilled in the art that the T-clip and the other overheat protection apparatuses are not restricted to the particular embodiments and applications described herein and with reference to the drawings, and that variations may be made therein without departing from the scope of the present invention, embodiments and applications, as defined in the appended claims and equivalents thereof.

What is claimed is:

1. An apparatus for limiting fluid temperature at a flowing-fluid-heating device in a closed-loop fluidic system, comprising:
   a flow splitter;
   an inlet to the splitter interposed between an outlet of a flowing-fluid-heating device and the splitter;
   a thermostatic mixing valve;
   a high-heat-dissipating flow path interposed between the splitter and the thermostatic mixing valve;
   a low-heal-dissipating flow path interposed between the splitter and the thermostatic mixing valve, in parallel with the high-heat-dissipating flow path;
   a spur flow path interposed between a) the high-heat-dissipating flow path and b) the inlet of the flowing-fluid-heating device; and
   a check valve interposed in the spur flow path;
   whereby overheating of the flowing-fluid-heating device is prevented.

2. The apparatus according to claim 1, wherein the flowing-fluid-heating device is a solar collector.

3. The apparatus according to claim 1, wherein the apparatus is an apparatus sized to service a plurality of connected flowing-fluid-heating devices.

4. The apparatus according to claim 1, wherein the cheek valve is a swing check valve.

* * * * *